United States Patent
Akihisa et al.

(10) Patent No.: US 7,802,543 B2
(45) Date of Patent: Sep. 28, 2010

(54) SPARK IGNITION TYPE INTERNAL COMBUSTION ENGINE

(75) Inventors: Daisuke Akihisa, Susono (JP); Daisaku Sawada, Gotenba (JP); Eiichi Kamiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 21 days.

(21) Appl. No.: 12/226,327

(22) PCT Filed: Apr. 9, 2007

(86) PCT No.: PCT/JP2007/058216

§ 371 (c)(1),
(2), (4) Date: Oct. 15, 2008

(87) PCT Pub. No.: WO2007/138794

PCT Pub. Date: Dec. 6, 2007

(65) Prior Publication Data

US 2009/0276140 A1 Nov. 5, 2009

(30) Foreign Application Priority Data

May 30, 2006 (JP) .............................. 2006-150262

(51) Int. Cl.
*F02D 15/04* (2006.01)
*F02D 13/00* (2006.01)

(52) U.S. Cl. .................. 123/48 R; 123/348; 123/90.15; 123/436; 123/435

(58) Field of Classification Search ................. 123/435, 123/48 R, 347, 348, 90.15, 436; 701/105
See application file for complete search history.

(56) References Cited

U.S. PATENT DOCUMENTS

| | | | |
|---|---|---|---|
| 7,076,360 B1 | 7/2006 | Ma | |
| 7,434,551 B2 * | 10/2008 | Zajac et al. | 123/70 R |
| 7,481,189 B2 * | 1/2009 | Zajac | 123/70 R |
| 2003/0106542 A1 | 6/2003 | Aoyama et al. | |
| 2004/0025818 A1 | 2/2004 | Baeuerle et al. | |

FOREIGN PATENT DOCUMENTS

| | | |
|---|---|---|
| DE | 10 2004 031 288 A1 | 1/2006 |
| EP | 1 526 265 A2 | 4/2005 |

(Continued)

OTHER PUBLICATIONS

USSR Authors Certificate No. 261026 issued Jan. 6, 1970 (with partial translation).

(Continued)

*Primary Examiner*—Hai H Huynh
(74) *Attorney, Agent, or Firm*—Oliff & Berridge, PLC

(57) ABSTRACT

An internal combustion engine provided with a variable compression ratio mechanism able to change a mechanical compression ratio and an actual compression action start timing changing mechanism able to change a start timing of an actual compression action. An amount of intake air in accordance with the required load is fed into a combustion chamber by controlling the closing timing of the intake valve, while a pressure, temperature or density in the combustion chamber at the end of a compression stroke is maintained substantially constant regardless of the engine load by controlling the mechanical compression ratio.

30 Claims, 21 Drawing Sheets

FOREIGN PATENT DOCUMENTS

| | | |
|---|---|---|
| JP | A 63-120820 | 5/1988 |
| JP | A 2002-221014 | 8/2002 |
| JP | A 2003-232233 | 8/2003 |
| JP | A 2003-314315 | 11/2003 |
| JP | A 2004-218522 | 8/2004 |
| RU | 2144991 C1 | 1/2000 |

OTHER PUBLICATIONS

Mar. 5, 2010 Office Action issued in Russian patent application No. 2008152099/06 (068515) (with translation).

* cited by examiner

FIG.6
(A)
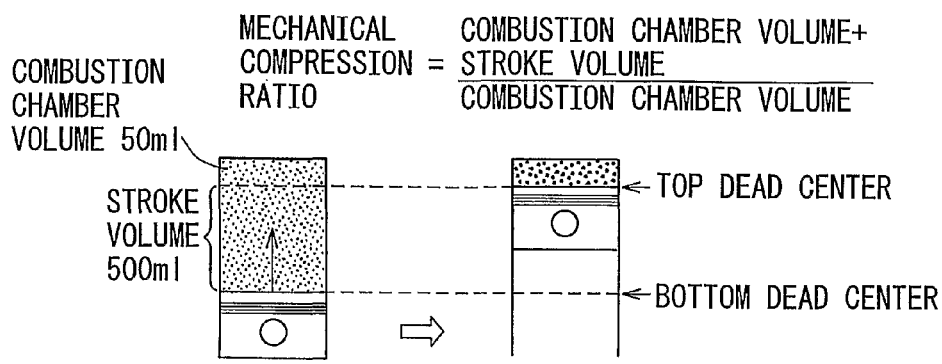
(B)
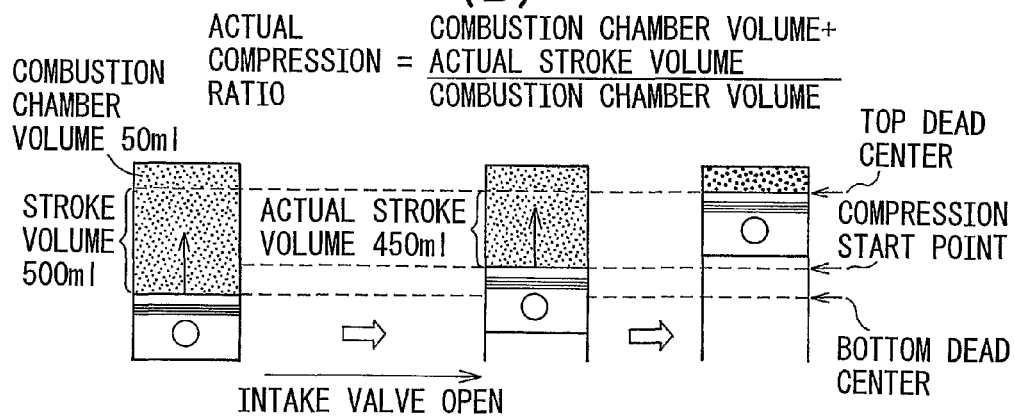
(C)
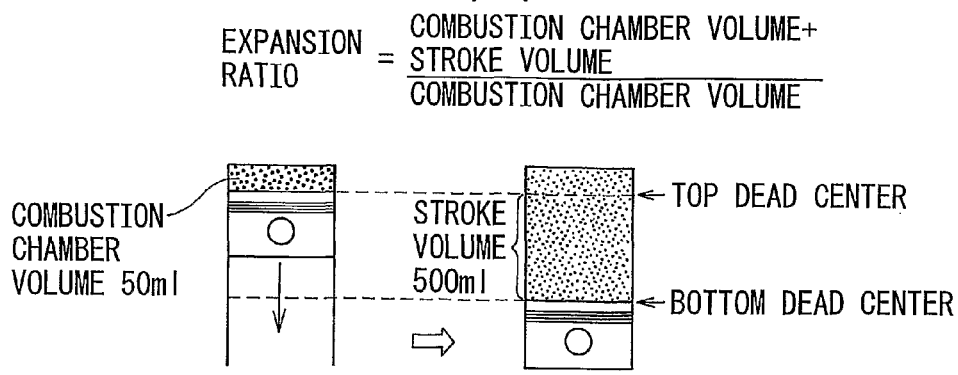

FIG.10
(A)
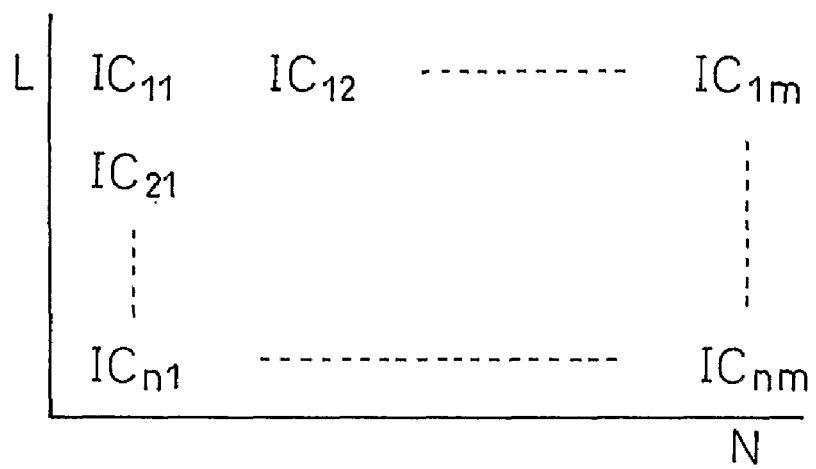
(B)
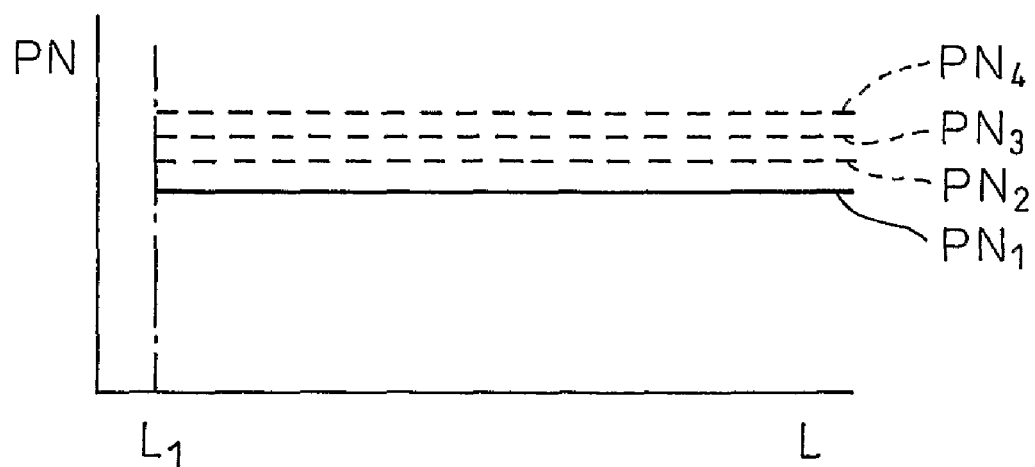

FIG.20
(A)
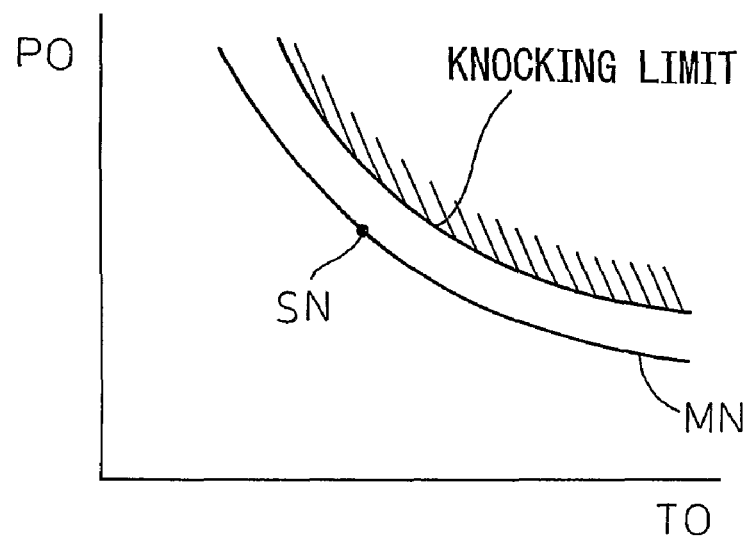
(B)
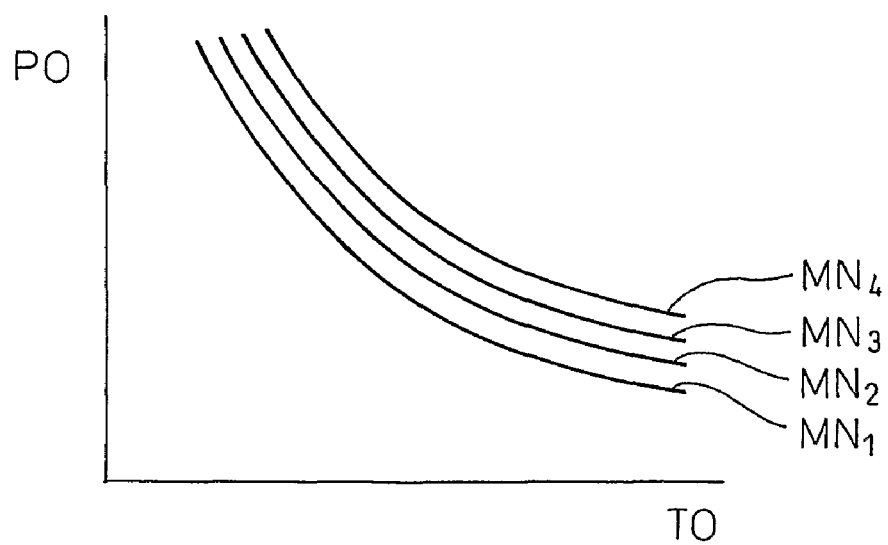

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of a an intake valve, performing a supercharging action by a supercharger at the time of engine medium load operation and engine high load operation, and increasing the mechanical compression ratio and delaying the closing timing of the intake valve as the engine load becomes lower at the time of engine medium and high load operation in the state holding the actual compression ratio constant (for example, see Japanese Patent Publication (A) No. 2004-218522).

However, in a spark ignition type internal combustion engine, the state of the gas in the combustion chamber at the end of the compression stroke right before combustion, for example, the pressure in the combustion chamber or gas temperature, has a large effect on the combustion. That is, generally speaking, the higher the pressure in the combustion chamber or gas temperature at the end of the compression stroke, the easier the combustion, but the higher the pressure in the combustion chamber or gas temperature, the more knocking ends up occurring. Therefore, the pressure in the combustion chamber or gas temperature is preferably maintained at the optimal value, that is, the highest value as possible in the range where knocking does not occur.

On the other hand, if the actual compression ratio is held constant as in the above known internal combustion engine, the suction gas fed into the combustion chamber is compressed by a constant ratio at all times. However, in this case, the pressure in the combustion chamber or gas temperature at the end of the compression stroke changes depending on the pressure in the combustion chamber or gas temperature at the time of start of compression, that is, the pressure or temperature of the suction gas fed into the combustion chamber. If the pressure or temperature of the suction gas fed into the combustion chamber becomes higher, the pressure in the combustion chamber or temperature at the end of the compression stroke also becomes higher along with this. Therefore, there is the problem that even if maintaining the actual compression ratio constant as in the above known internal combustion engine, the pressure in the combustion chamber or gas temperature at the end of the compression stroke cannot be held at the optimum value.

DISCLOSURE OF THE INVENTION

An object of the present invention is to provide a spark ignition type internal combustion engine maintaining the state of the gas in the combustion chamber at the end of the compression stroke in the optimum state, so obtaining good combustion with no occurrence of knocking.

According to the present invention, there is provided a spark ignition type internal combustion engine comprising a variable valve timing mechanism able to control a closing timing of an intake valve and a variable compression ratio mechanism able to change a mechanical compression ratio, the closing timing of the intake valve is controlled so that an amount of intake air in accordance with the required load is fed into a combustion chamber, and the mechanical compression ratio is controlled so that the pressure in the combustion chamber at the end of the compression stroke becomes substantially constant under substantially the same engine speed regardless of the engine load.

Further, according to the present invention, there is provided a spark ignition type internal combustion engine comprising a variable valve timing mechanism able to control a closing timing of an intake valve and a variable compression ratio mechanism able to change a mechanical compression ratio, the closing timing of the intake valve is controlled so that an amount of intake air in accordance with the required load is fed into a combustion chamber, and the mechanical compression ratio is controlled so that the temperature of the gas in the combustion chamber at the end of the compression stroke becomes substantially constant under substantially the same engine speed regardless of the engine load.

Further, according to the present invention, there is provided a spark ignition type internal combustion engine comprising a variable valve timing mechanism able to control a closing timing of an intake valve and a variable compression ratio mechanism able to change a mechanical compression ratio, the closing timing of the intake valve is controlled so that an amount of intake air in accordance with the required load is fed into a combustion chamber, target values of the pressure in the combustion chamber and gas temperature at the end of the compression stroke is stored in advance, and the mechanical compression ratio is controlled so that the pressure in the combustion chamber and gas temperature at the end of the compression stroke become the stored target values.

Further, according to the present invention, there is provided a spark ignition type internal combustion engine comprising a variable valve timing mechanism able to control a closing timing of an intake valve and a variable compression ratio mechanism able to change a mechanical compression ratio, the closing timing of the intake valve is controlled so that an amount of intake air in accordance with the required load is fed into a combustion chamber, and the mechanical compression ratio is controlled so that the density of gas in the combustion chamber at the end of the compression stroke becomes substantially constant under substantially the same engine speed regardless of the engine load.

BRIEF DESCRIPTION OF THE DRAWINGS

FIG. 6 is a view for explaining the engine compression ratio, actual compression ratio, and expansion ratio.

FIG. 10 is a view showing the target pressure etc.

FIG. 20 is a view showing a target value etc.

BEST MODE FOR CARRYING OUT THE INVENTION

Figure 1:
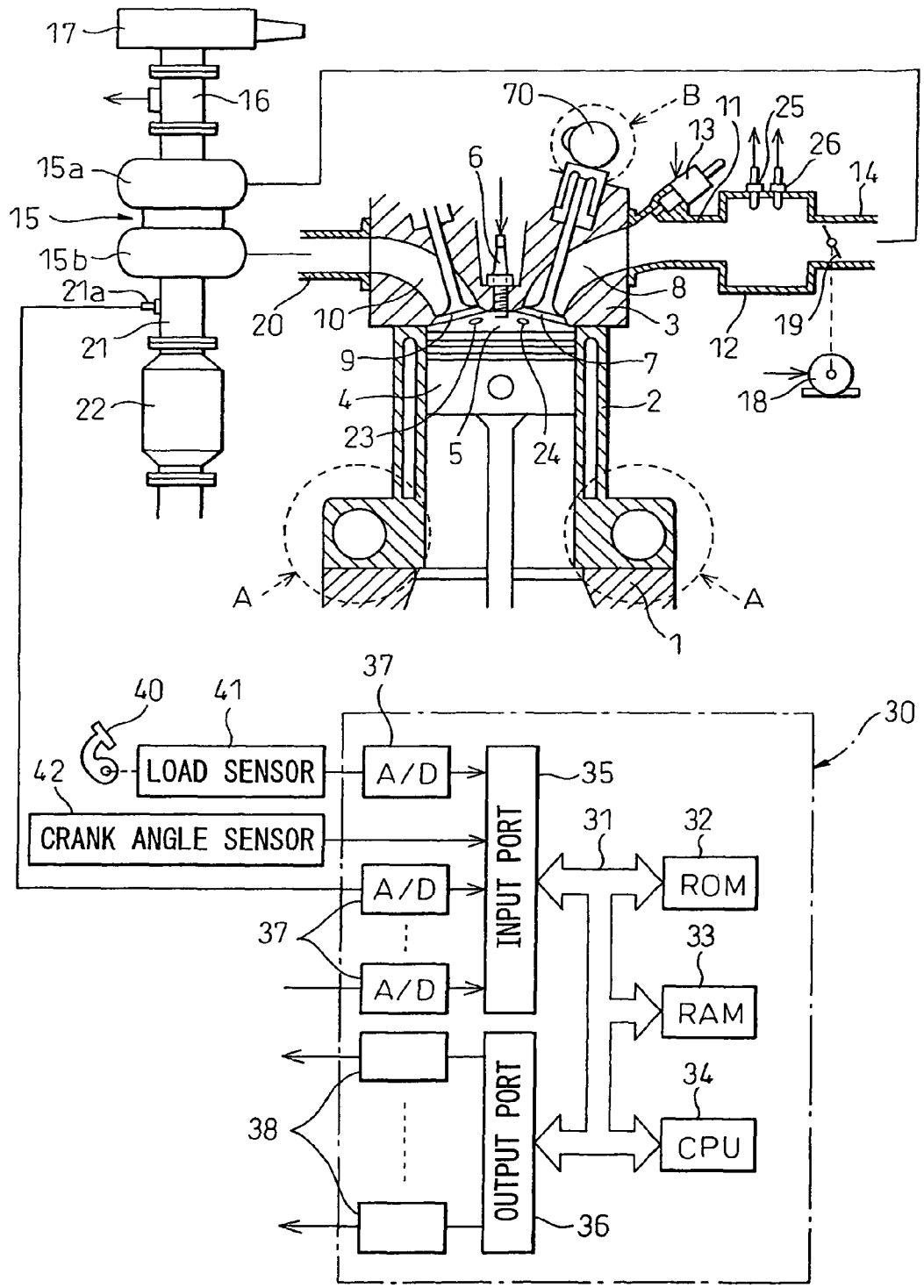
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected via an intake duct 14 to an outlet of the compressor 15a of the exhaust turbocharger 15, while an inlet of the compressor 15a is connected through an intake air amount detector 16 using for example a hot wire to an air cleaner 17. The intake duct 14 is provided inside it with a throttle valve 19 driven by an actuator 18.

On the other hand, the exhaust port 10 is connected through the exhaust manifold 20 to the inlet of the exhaust turbine 15b of the exhaust turbocharger 15, while an outlet of the exhaust turbine 15b is connected through an exhaust pipe 21 to for example a catalytic converter 22 housing a three-way catalyst. The exhaust pipe 21 has an air-fuel ratio sensor 21a arranged in it.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with a variable valve timing mechanism B able to control the closing timing of the intake valve 7 so as to change the start timing of the actual compression action.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 16 and the output signal of the air-fuel ratio sensor 21a are input through corresponding AD converters 37 to the input port 35. Above the top of the combustion chamber 5 are provided a pressure sensor 23 for detecting the pressure in the combustion chamber 5 and a temperature sensor 24 for detecting the temperature of the gas in the combustion chamber 5. The output signals of the pressure sensor 23 and temperature sensor 24 are input through corresponding AD converters 37 to the input port 35. Further, the surge tank 12, that is, the intake passage downstream of the throttle valve 19, is provided with a pressure sensor 25 for detecting the pressure in the intake passage and a temperature sensor 26 for detecting the temperature of the intake air flowing into the combustion chamber 5. The output signals of the pressure sensor 25 and temperature sensor 26 are input through corresponding AD converters 37 to the input port 35.

Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 18, variable compression ratio mechanism A, and variable valve timing mechanism B.

Figure 2:
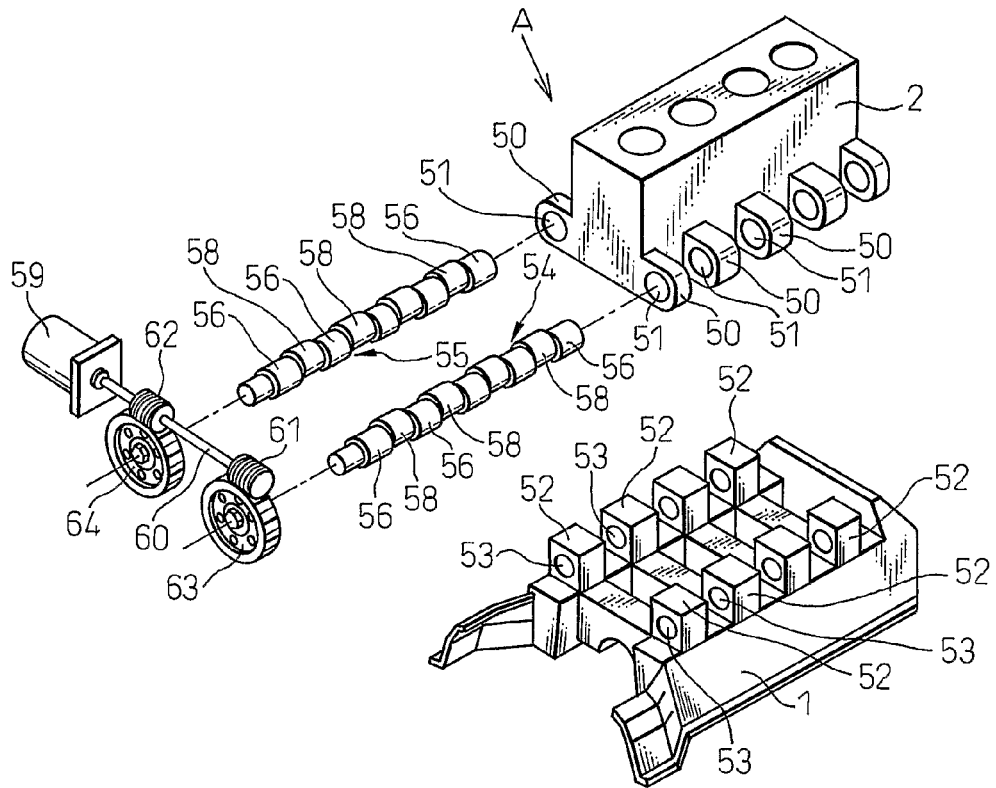
FIG. 2 is a disassembled perspective view of a variable compression ratio mechanism.
Figure 3:
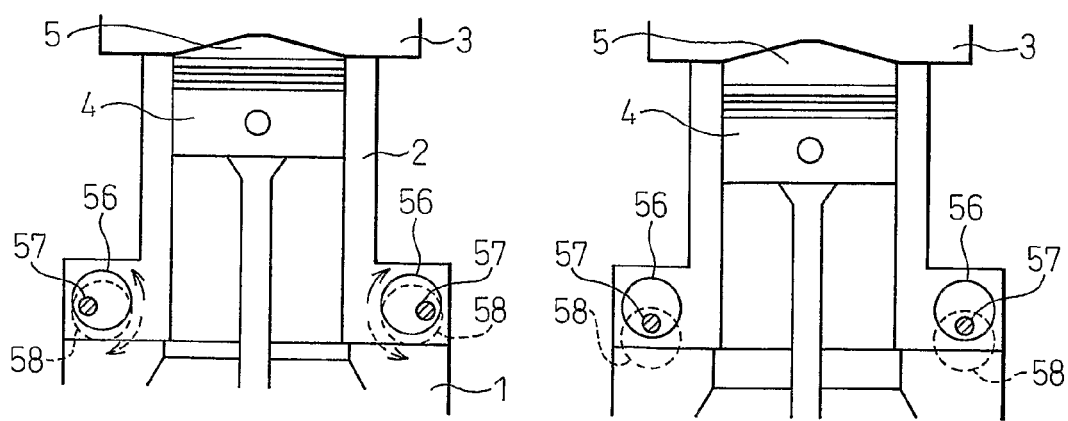
FIG. 3 is a side cross-sectional view of the illustrated internal combustion engine.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
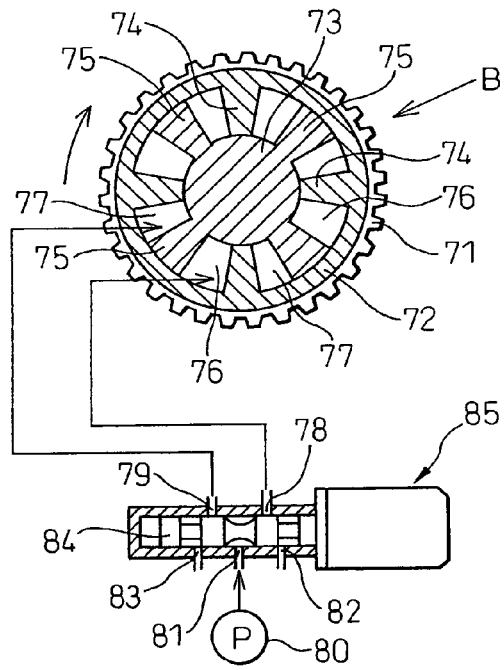
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 85. This working oil feed control valve 85 is provided with hydraulic ports 78, 79 connected to the hydraulic chambers 76, 77, a feed port 81 for working oil discharged from a hydraulic pump 80, a pair of drain ports 82, 83, and a spool valve 84 for controlling connection and disconnection of the ports 78, 79, 81, 82, 83.

To advance the phase of the cams of the intake valve drive cam shaft 70, in FIG. 4, the spool valve 84 is made to move to the right, working oil fed from the feed port 81 is fed through the hydraulic port 78 to the hydraulic chambers for advancing 76, and working oil in the hydraulic chambers for retarding 77 is drained from the drain port 83. At this time, the shaft 73 is made to rotate relative to the cylindrical housing 72 in the arrow direction.

As opposed to this, to retard the phase of the cams of the intake valve drive cam shaft 70, in FIG. 4, the spool valve 84 is made to move to the left, working oil fed from the feed port 81 is fed through the hydraulic port 79 to the hydraulic chambers for retarding 77, and working oil in the hydraulic chambers for advancing 76 is drained from the drain port 82. At this time, the shaft 73 is made to rotate relative to the cylindrical housing 72 in the direction opposite to the arrows.

When the shaft 73 is made to rotate relative to the cylindrical housing 72, if the spool valve 84 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
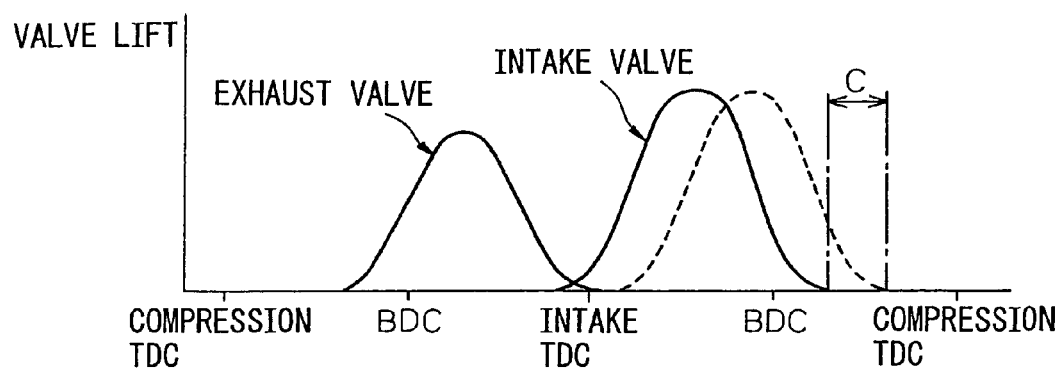
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used. Further, in the present invention, the variable valve timing mechanism B is used to change the start timing of the actual compression action, so even if not a variable valve timing mechanism, any form of actual compression action start timing changing mechanism can be used if an actual compression action start timing changing mechanism able to change a start timing of an actual compression action.

Next, the meaning of the terms used in the present application will be explained with reference to FIG. 6. Note that FIG. 6(A), (B), and (C) show for explanatory purposes an engine with a volume of the combustion chambers of 50 ml and a stroke volume of the piston of 500 ml. In these FIG. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+ actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the most basic features of the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIG. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
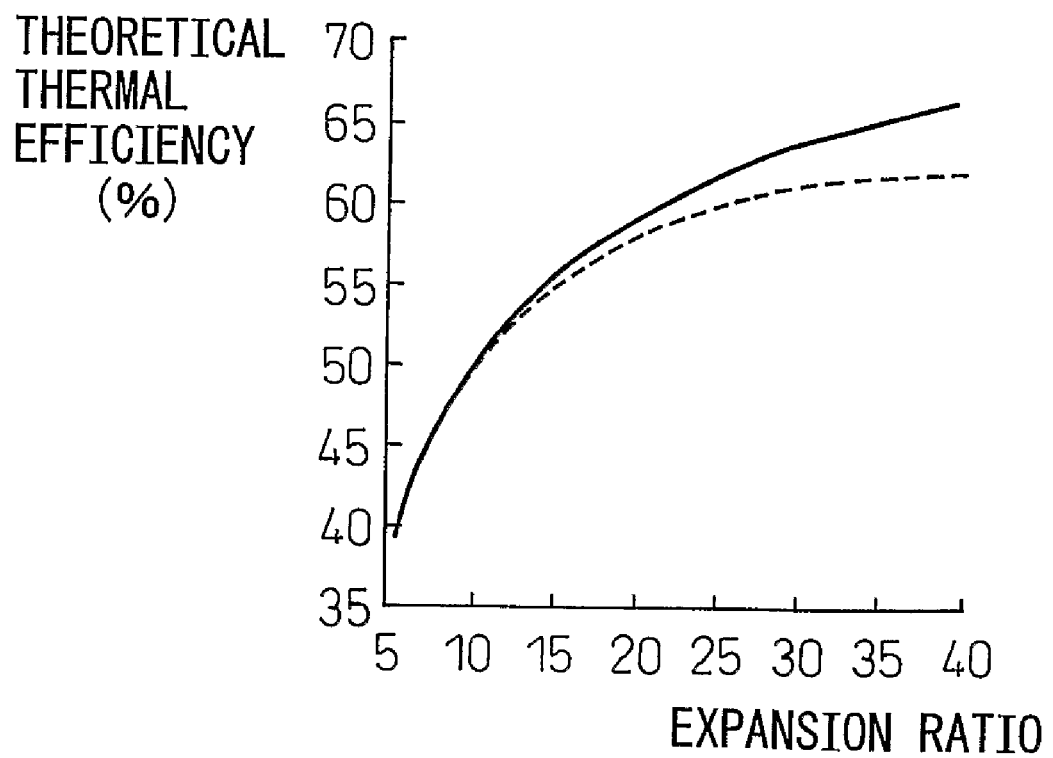
FIG. 7 is a view showing the relationship between the theoretical thermal efficiency and expansion ratio.
Figure 8:
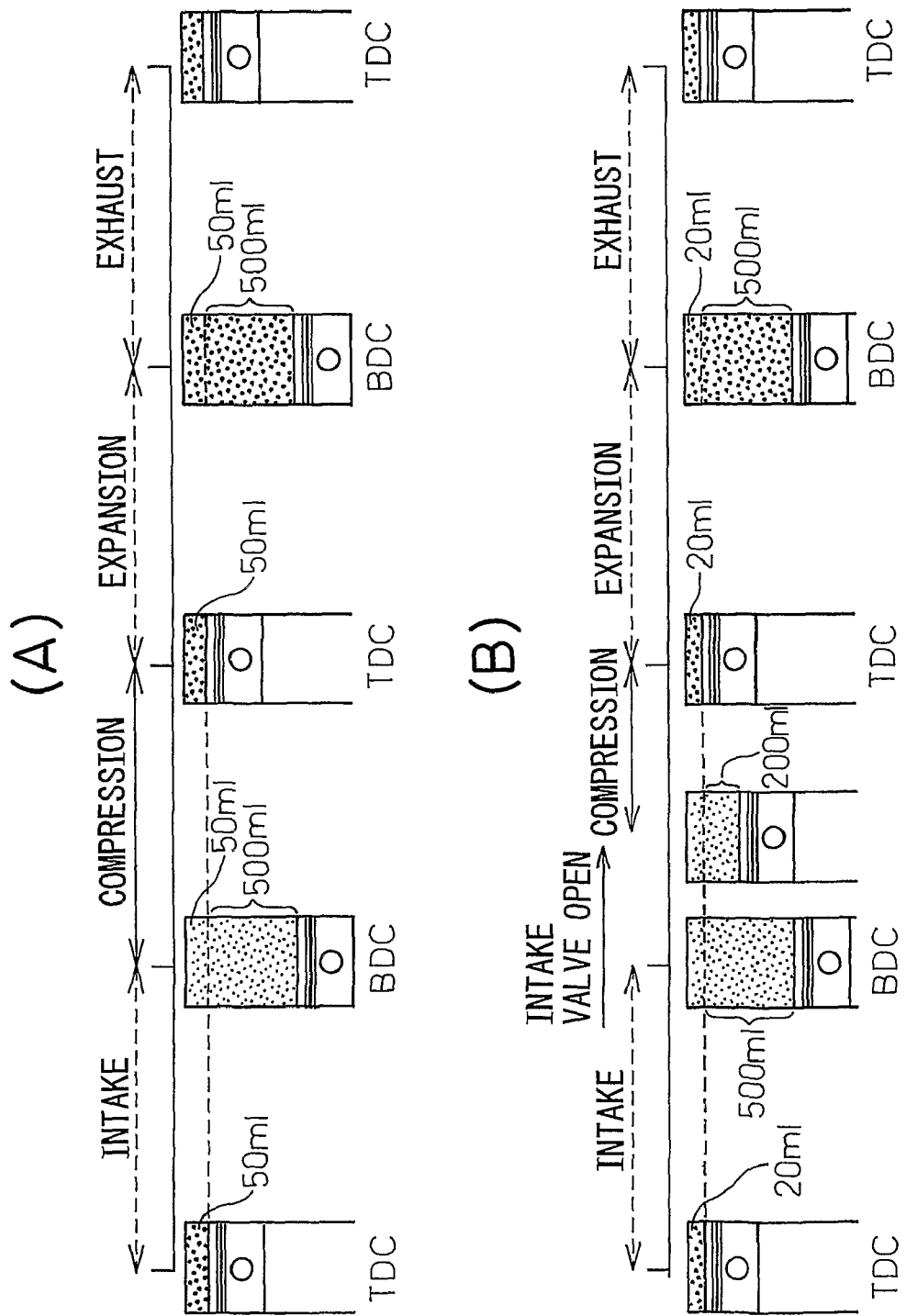
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

Further, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. In this case, as explained above, the larger the expansion ratio, the more the thermal efficiency is improved. On the other hand, if raising the engine compression ratio, the expansion ratio becomes higher. Therefore to improve the thermal efficiency at the time of vehicle operation, it is preferable to raise the mechanical compression ratio at the time of engine low load operation as much as possible to enable the maximum expansion ratio to be obtained at the time of engine low load operation. Further, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set. This is the basic feature of the present invention.

Next, the operational control as a whole according to the present invention will be explained with reference to FIG. 9.

Figure 9:
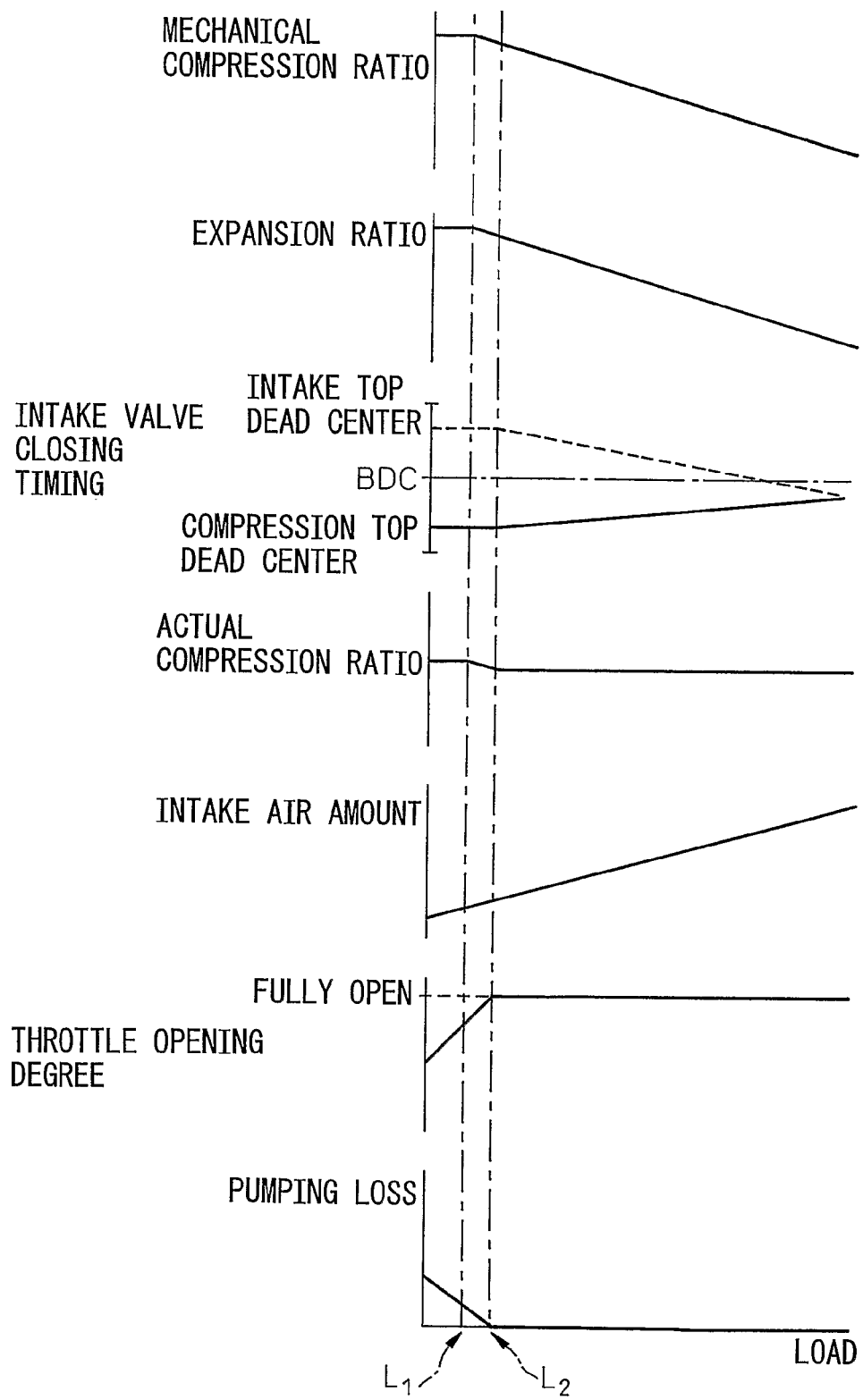
FIG. 9 is a view showing the change in mechanical compression ratio etc. in accordance with the engine load.

FIG. 9 shows the changes in the mechanical compression ratio, expansion ratio, closing timing of the intake valve 7, pressure in the combustion chamber 5 at the end of the compression stroke, more accurately the pressure in the combustion chamber 5 right before combustion or right before an ignition action by a spark plug 6, the amount of intake air, opening degree of the throttle valve 17, and pumping loss along with the engine load. Note that in the embodiment according to the present invention, ordinarily the average air-fuel ratio in the combustion chamber 5 is feedback controlled to the stoichiometric air-fuel ratio based on the output signal of the air-fuel ratio sensor 21a so that the three-way catalyst in the catalytic converter 22 can simultaneously reduce the unburned HC, CO, and $NO_x$ in the exhaust gas.

Now, in the present invention, the closing timing of the intake valve 7 is controlled so that an amount of intake air in accordance with the required load is fed into the combustion chamber 5. The mechanical compression ratio is controlled so that the state of the gas in the combustion chamber 5 at the end of the compression stroke becomes substantially constant regardless of the engine load. Note that in the example shown in FIG. 9, the mechanical compression ratio is controlled so that the pressure in the combustion chamber 5 at the end of the compression stroke becomes substantially constant regardless of the engine load.

If the closing timing of the intake valve 7 and the mechanical compression ratio are controlled in this way, the closing timing of the intake valve 7 and mechanical compression ratio change in accordance with the engine load as shown generally by the solid line of FIG. 9. Note that this FIG. 9 shows the case where the engine load changes while the engine speed is maintained constant.

Now, in the present invention, at the time of engine high load operation, as explained above, the ordinary cycle shown in FIG. 8(A) is executed. At this time, the amount of intake air is large, so as shown by the solid line in FIG. 9, the closing timing of the intake valve 7 is advanced as shown by the solid line in FIG. 5. Further, at this time, as shown in FIG. 9, the mechanical compression ratio becomes lower, so the expansion ratio becomes lower. Note that at this time, opening degree of the throttle valve 17 is maintained fully opened or substantially fully opened, so the pumping loss becomes zero.

On the other hand, as shown in FIG. 9, if the engine load becomes lower, the amount of intake air to be fed inside the combustion chamber 5 is reduced along with this, so as shown by the solid line in FIG. 9, as the engine load becomes lower, the closing timing of the intake valve 7 is delayed. At this time as well, it is learned that the throttle valve 17 is held at the fully opened or substantially fully opened state, therefore the amount of intake air fed to the combustion chamber 5 is controlled not by the throttle valve 17, but by changing the closing timing of the intake valve 7. Therefore, at this time as well, the pumping loss becomes zero.

On the other hand, when the engine load becomes lower and the amount of intake air fed to the combustion chamber 5 is reduced in this way, to maintain the pressure in the combustion chamber 5 at the end of the compression stroke constant, it is necessary to make the volume of the combustion chamber 5 in the compression top dead center smaller, that is, to increase the mechanical compression ratio. Therefore, as shown in FIG. 9, as the engine load becomes lower, the mechanical compression ratio is increased, therefore the expansion ratio is also increased.

If the engine load becomes further lower, to further reduce the amount of intake air to be fed inside the combustion chamber 5, as shown by the solid line in FIG. 9, the closing timing of the intake valve 7 is delayed to the limit closing timing enabling control of the amount of intake air fed to the combustion chamber 5. In the region of a load lower than the engine load $L_2$ when the closing timing of the intake valve 7 reaches the limit closing timing, the closing timing of the intake valve 7 is held at the limit closing timing. If the closing timing of the intake valve 7 is held at the limit closing timing, the amount of intake air will no longer be able to be controlled by the change of the closing timing of the intake valve 7. Therefore, the amount of intake air has to be controlled by some other method.

In the embodiment shown in FIG. 9, at this time, that is, in the region of a load lower than the engine load $L_2$ when the closing timing of the intake valve 7 reaches the limit closing timing, the throttle valve 17 is used to control the amount of intake air fed to the combustion chamber 5. However, if using the throttle valve 17 to control the amount of intake air, as shown in FIG. 9, the pumping loss increases.

Note that to prevent this pumping loss, in the region of a load lower than the engine load $L_2$ when the closing timing of the intake valve 7 reaches the limit closing timing, the throttle valve 17 is held in the fully opened or substantially fully opened. In that state, the lower the engine load, the larger the air-fuel ratio may be made. At this time, the fuel injector 13 is preferably arranged in the combustion chamber 5 to perform stratified combustion.

On the other hand, if the engine load becomes lower and the amount of intake air fed to the combustion chamber 5 is reduced, the mechanical compression ratio is further increased to maintain the pressure in the combustion chamber 5 at the end of the compression stroke constant. Next, when the mechanical compression ratio reaches the limit mechanical compression ratio forming the structural limit of the combustion chamber 5, in the region of a load lower than the engine load L1 when the mechanical compression ratio reaches the limit mechanical compression ratio, the mechanical compression ratio is held at the limit engine compression ratio. Therefore at the time of engine low load operation, the mechanical compression ratio becomes maximum, and the expansion ratio also becomes maximum. Putting this another way, in the present invention, so as to obtain the maximum expansion ratio at the time of engine low load operation, the mechanical compression ratio is made maximum.

In this way, according to the present invention, regardless of the engine load, the pressure in the combustion chamber 5 at the end of the compression stroke is made substantially constant. That is, regardless of the engine load, the state of the gas in the combustion chamber 5 at the end of the compression stroke is made the optimum state of the gas giving stable good combustion without causing knocking. Accordingly, it is possible to obtain good combustion stable in all load regions such as at the time of engine low load operation where the mechanical compression ratio becomes maximum.

As explained above, in the superhigh expansion ratio cycle shown in FIG. 8(B), the expansion ratio is made 26. The higher this expansion ratio, the better, but if 20 or more, a considerably high theoretical thermal efficiency can be obtained. Therefore, in the present invention, at the time of engine low load operation, the variable compression ratio mechanism A is formed so that the expansion ratio becomes 20 or more.

Further, in the example shown in FIG. 9, the mechanical compression ratio is changed continuously in accordance with the engine load. However, the mechanical compression ratio can also be changed in stages in accordance with the engine load.

Further, as shown by the broken line in FIG. 9, as the engine load becomes lower, by advancing the closing timing of the intake valve 7 as well, it is possible to control the amount of intake air without depending on the throttle valve 17. Therefore, in FIG. 9, if covering both the case shown by the solid line and the case shown by the broken line in expression, in the embodiment according to the present invention, the closing timing of the intake valve 7 is shifted as the engine load becomes lower in a direction away from intake bottom dead center BDC until the limit closing timing $L_2$ enabling control of the amount of intake air fed into the combustion chamber.

Next, an embodiment for controlling the mechanical compression ratio so that the pressure in the combustion chamber 5 at the end of the compression stroke becomes substantially constant regardless of the engine load will be explained with reference to FIG. 10 to FIG. 14.

FIG. 10(A) shows a map of the closing timing IC of the intake valve 7 required for feeding an amount of intake air according to the required load to the inside of the combustion chamber 5. As will be understood from FIG. 10(A), the closing timing IC of the intake valve 7 is a function of the engine load L and engine speed N. This map is stored in advance in the ROM 32.

FIG. 10(B) shows the relationship between the target pressure PN of the combustion chamber 5 at the end of the compression stroke, more precisely speaking, the target pressure PN in the combustion chamber 5 right before combustion or right before ignition by a spark plug 6, and the engine load L. In FIG. 10(B), $PN_1$, $PN_2$, $PN_3$, and $PN_4$ show target pressures for different engine speeds. In this case, for the engine speed, there is the relationship $PN_1 < PN_2 < PN_3 < PN_4$. That is, the higher the engine speed, the more the inside of the combustion chamber 5 is disturbed, so knocking becomes difficult, therefore the target pressure PN is made higher the higher the engine speed.

As shown in FIG. 10(B), the target pressure PN is made constant under the same engine speed regardless of the engine load. However, this target pressure PN may also be changed somewhat depending on the magnitude of the engine load.

Figure 11:
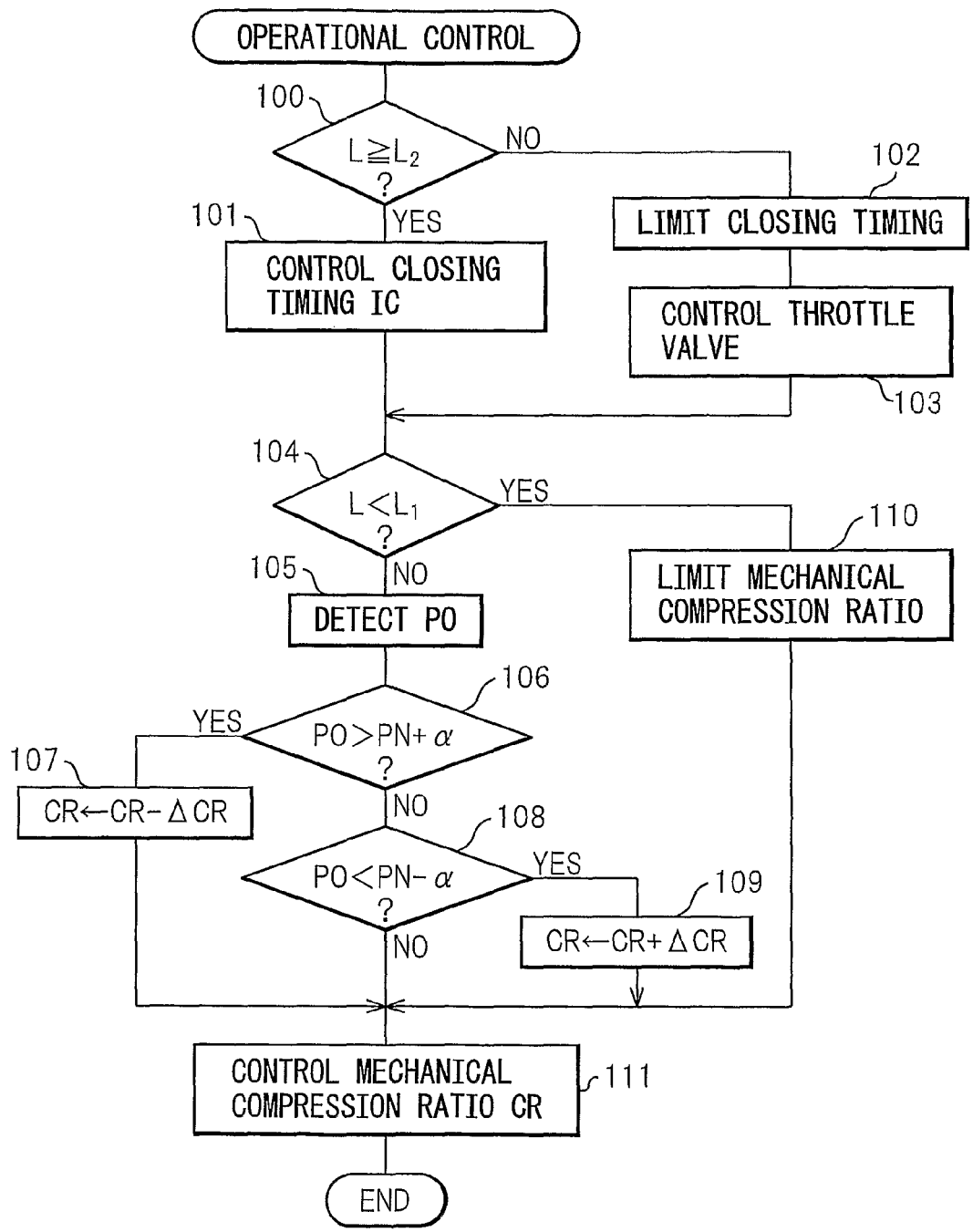
FIG. 11 is a flowchart for operational control.

FIG. 11 shows the operation control routine when directly detecting the pressure in the combustion chamber 5 and controlling the mechanical compression ratio based on the detected pressure in the combustion chamber 5.

Referring to FIG. 11, first, at step 100, it is judged if the engine load L is higher than the load $L_2$ shown in FIG. 9. When $L \geq L_2$, the routine proceeds to step 101 where the map shown in FIG. 10(A) is used to calculate the closing timing IC of the intake valve 7 and the intake valve 7 is controlled to close at the calculated closing timing IC. Next, the routine proceeds to step 104. As opposed to this, when it is judged at step 100 that $L<L_2$, the routine proceeds to step 102 where the closing timing of the intake valve 7 is made the limit closing timing, then at step 103, the amount of intake air is controlled by the throttle valve 19. Next, the routine proceeds to step 104.

At step 104, it is judged if the engine load L is lower than the load $L_1$ shown in FIG. 9. When $L \geq L_1$, the routine proceeds to step 105 where the pressure PO in the combustion chamber 5 at the end of the compression stroke is detected by the pressure sensor 23. Next, at step 106, it is judged if the pressure PO is higher than the target pressure PN calculated from FIG. 10(B) plus a fixed value α, that is, the value PN+α. When PO>PN+α, the routine proceeds to step 107 where the mechanical compression ratio CR is reduced by a fixed value ΔCR. Next, the routine proceeds to step 111. As opposed to this, when it is judged at step 106 that PO≦PN+α, the routine proceeds to step 108 where it is judged if the pressure PO is lower than the target pressure PN calculated from FIG. 10(B) minus the fixed value α, that is, the value PN−α. When PO<PN−α, the routine proceeds to step 109 where the mechanical compression ratio CR is increased by the fixed value ΔCR. Next, the routine proceeds to step 111.

On the other hand, when it is judged at step 104 that $L<L_1$, the routine proceeds to step 110 where the mechanical compression ratio CR is made the limit mechanical compression ratio. Next, the routine proceeds to step 111. At step 111, the calculated mechanical compression ratio CR is obtained by controlling the variable compression ratio mechanism A. That is, when $L \geq L_1$, the pressure PO is made the target pressure PN by controlling the mechanical compression ratio CR, while when $L<L_1$, the mechanical compression ratio CR is fixed at the limit mechanical compression ratio.

Figure 12:
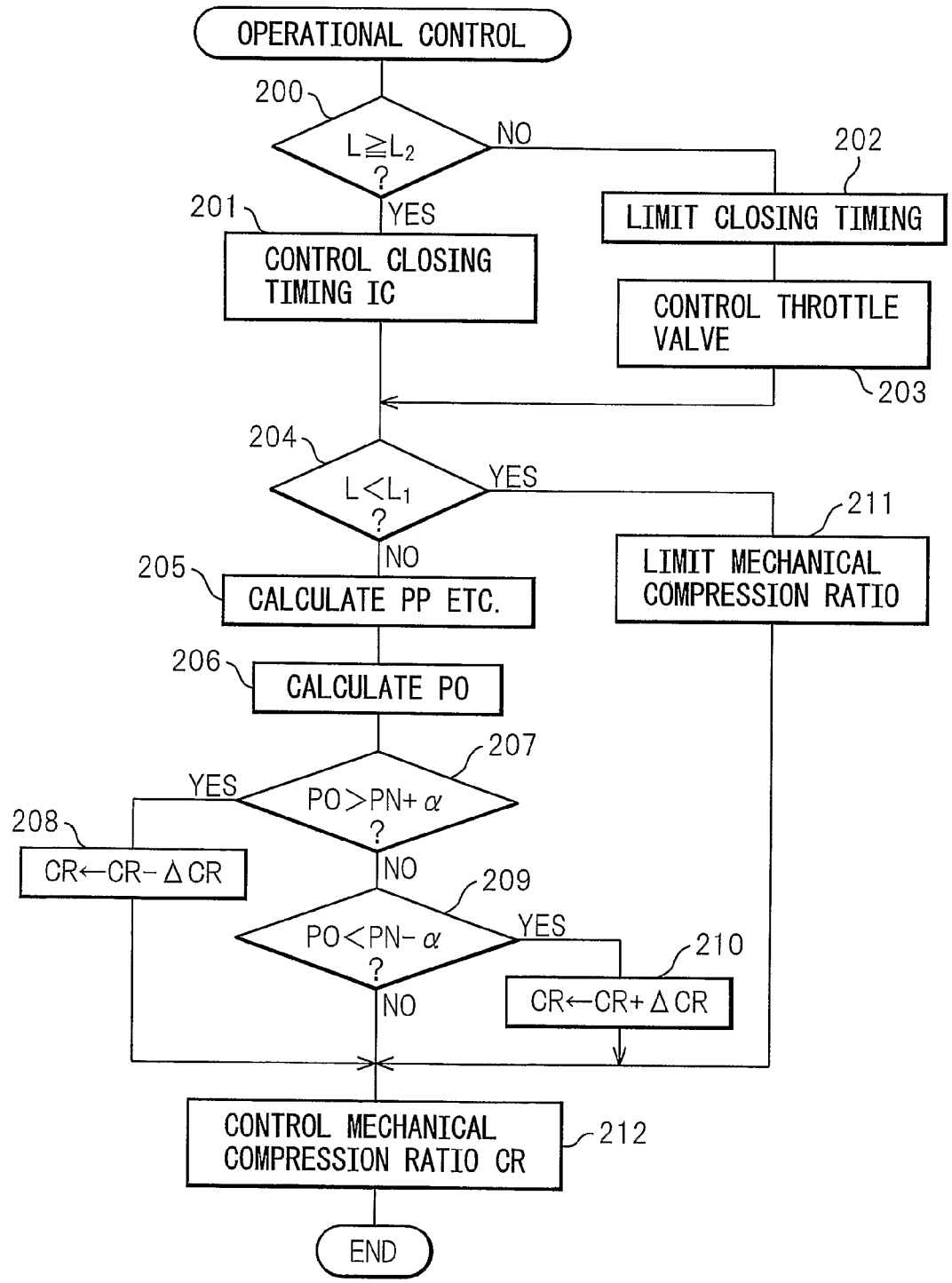
FIG. 12 is a flowchart for operational control.

FIG. 12 shows the operation control routine when detecting the pressure in the engine intake passage, using this detected pressure to estimate the pressure in the combustion chamber 5 at the end of the compression stroke, and controlling the mechanical compression ratio based on the estimated pressure in the combustion chamber 5.

Referring to FIG. 12, first, at step 200, it is judged if the engine load L is higher than the load $L_2$ shown in FIG. 9. When $L \geq L_2$, the routine proceeds to step 201 where the map shown in FIG. 10(A) is used to calculate the closing timing IC of the intake valve 7 and the intake valve 7 is controlled to close at the calculated closing timing IC. Next, the routine proceeds to step 204. As opposed to this, when it is judged at step 200 that $L<L_2$, the routine proceeds to step 202 where the closing timing of the intake valve 7 is made the limit closing timing, then at step 203, the amount of intake air is controlled by the throttle valve 19. Next, the routine proceeds to step 204.

At step 204, it is judged if engine load L is lower than the load $L_1$ shown in FIG. 9. When $L \geq L_1$, the routine proceeds to step 205 where the pressure sensor 25 is used to detect the pressure PP in the intake passage and the volume $V_1$ of the combustion chamber 5 at the actual time of start of compression is calculated from the closing timing IC of the intake valve 7, for example, the volume $V_0$ of the combustion chamber 5 right before ignition is calculated from the ignition timing. Next, at step 206, the pressure P0 in the combustion chamber 5 at the end of the compression stroke is calculated from the detected pressure PP in the intake passage and $V_1$, $V_0$. That is, if the pressure is P, the volume is V, and the ratio of specific heat is K ($=C_p/C_v$), when adiabatic compression is performed, the relationship $PV^k$=constant stands. If the pressure in the combustion chamber 5 at the time of start of the adiabatic compression is made the pressure PP in the intake passage, this relationship may be used to find the pressure P0 in the combustion chamber 5 at the end of the compression stroke.

Next, at step 207, it is judged if the pressure PO is higher than the target pressure PN calculated from FIG. 10(B) plus a fixed value α, that is, the value PN+α. When PO>PN+α, the routine proceeds to step 208 where the mechanical compression ratio CR is reduced by a fixed value ΔCR. Next, the routine proceeds to step 212. As opposed to this, when it is judged at step 207 that PO≦PN+α, the routine proceeds to step 209 where it is judged if the pressure PO is lower than the target pressure PN calculated from FIG. 10(B) minus the fixed value α, that is, the value PN−α. When PO<PN−α, the routine proceeds to step 210 where the mechanical compression ratio CR is increased by a fixed value ΔCR. Next, the routine proceeds to step 212.

On the other hand, when it is judged at step 204 that $L<L_1$, the routine proceeds to step 211 where the mechanical compression ratio CR is made the limit mechanical compression ratio. Next, the routine proceeds to step 212. At step 212, the calculated mechanical compression ratio CR is obtained by controlling the variable compression ratio mechanism A.

Figure 13:
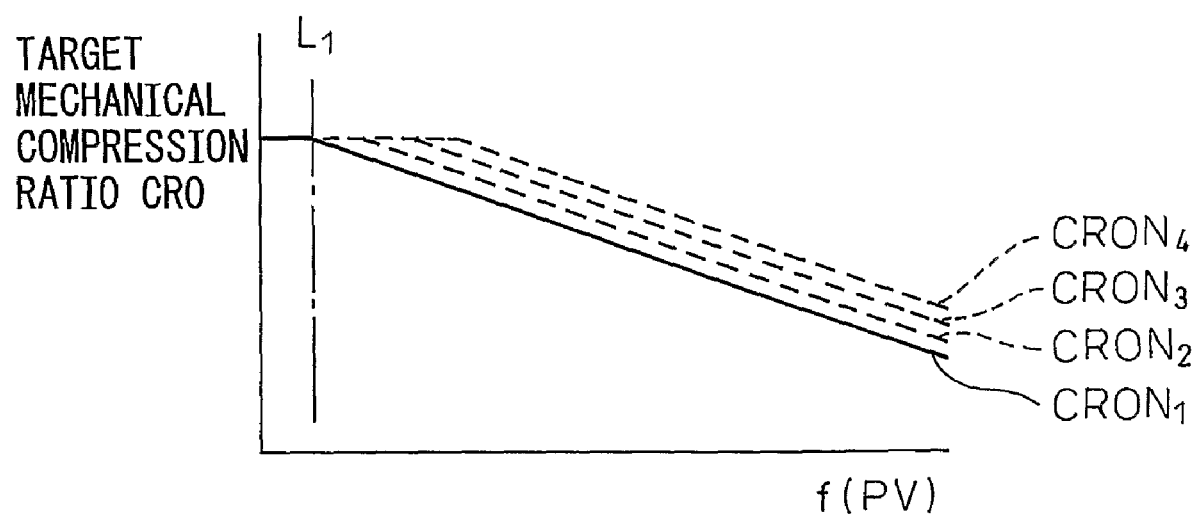
FIG. 13 is a view showing a target mechanical compression ratio.
Figure 14:
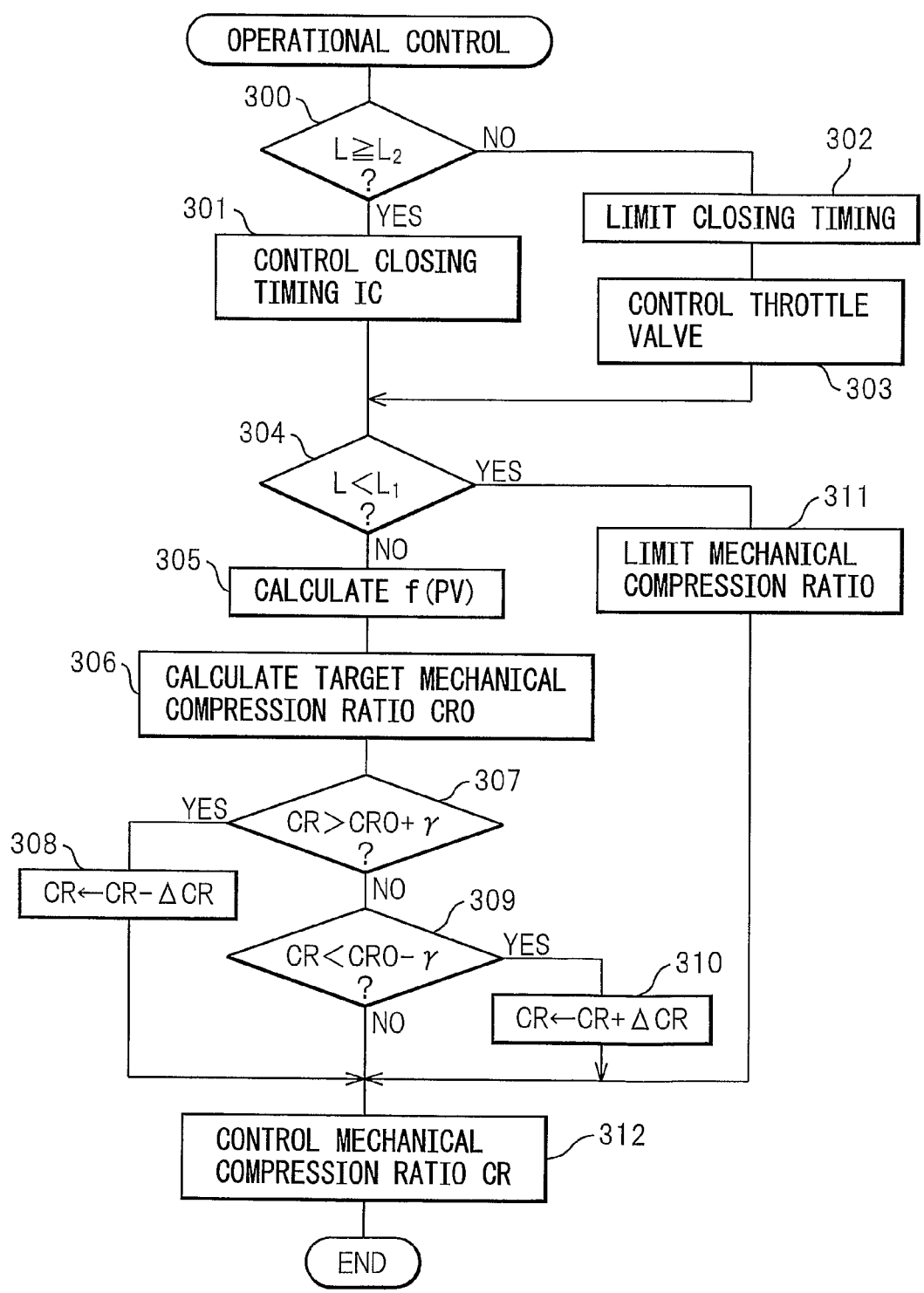
FIG. 14 is a flowchart for operational control.

FIG. 13 and FIG. 14 show a modification. In this modification, as shown in FIG. 13, the relationship between the target mechanical compression ratio CRO required for making at the pressure in the combustion chamber 5 at compression top dead center the target pressure and the mechanical compression ratio determination function f(PV) is stored in advance. Based on this relationship, the mechanical compression ratio is controlled. Note that in FIG. 13, $CRON_1$, $CRON_2$, $CRON_3$, and $CRON_4$ show the target mechanical compression ratios for different engine speeds. In this case, for the engine speed, there is the relationship $CRON_1<CRON_2<CRON_3<CRON_4$. That is, the higher the engine speed, the higher the target mechanical compression ratio is made.

Next, the mechanical compression ratio determination function f(PV) will be explained. If the pressure in the combustion chamber 5 and the volume of the combustion chamber 5 at compression top dead center are $P_0$ and $V_0$, the volume of the combustion chamber 5 at compression bottom dead center is $V_s$, and the pressure in the combustion chamber 5 and the volume of the combustion chamber 5 when the compression action is actually started are $P_1$ and $V_1$, when adiabatic compression is performed, $P_0V_0^K=P_1V_1^K$ stands. This may be modified to $V_0=(P_1/P_0)^{1/K} \cdot V_1$. On the other hand, the mechanical compression ratio is expressed by $V_s/V_0$. Therefore, the mechanical compression ratio is expressed by $V_s/V_0=V_s \cdot P_0^{1/K}/(P_1^{1/K} \cdot V_1)$. Here, $P_1^{1/K} \cdot V_1$ is made the mechanical compression ratio determination function f(PV). In this case, the relationship between the mechanical compression ratio determination function f(PV) and target mechanical compression ratio CRO becomes as shown in FIG. 13.

That is, as shown in FIG. 13, if the pressure $P_1$ in the combustion chamber 5 at the actual time of start of compression is high, the mechanical compression ratio determination function f(PV) becomes larger, therefore the target mechanical compression ratio CRO falls. On the other hand, if the volume $V_1$ of the combustion chamber 5 at the actual time of start of compression becomes smaller, the mechanical compression ratio determination function f(PV) becomes smaller and therefore the target mechanical compression ratio CRO becomes larger. In the embodiment according to the present invention, the pressure in the intake passage detected by the pressure sensor 25 is made the pressure $P_1$ in the combustion chamber 5 at the actual time of start of compression.

On the other hand, the volume $V_1$ of the combustion chamber 5 at the actual time of start of compression can be calculated from the closing timing IC of the intake valve 7. Further, this volume $V_1$ is proportional to the amount of intake air to be fed inside the combustion chamber 5, so this volume $V_1$ can be calculated from the amount of intake air fed to the combustion chamber 5. In this case, the amount of intake air fed to the combustion chamber 5 is expressed by C·Ga/N (C is a proportional constant) where the amount of intake air sucked in per unit time is Ga and the engine speed is N. Therefore, the volume $V_1$ can be calculated from the amount Ga of intake air detected by the intake air amount detector 16 and the engine speed N.

Referring to FIG. 14, first, at step 300, it is judged if the engine load L is higher than the load $L_2$ shown in FIG. 9. When $L \geq L_2$, the routine proceeds to step 301 where the map shown in FIG. 10(A) is used to calculate the closing timing IC of the intake valve 7 and the intake valve 7 is controlled to close at the calculated closing timing IC. Next, the routine proceeds to step 304. As opposed to this, when it is judged at step 300 that $L<L_2$, the routine proceeds to step 302 where the closing timing of the intake valve 7 is made the limit closing timing, then at step 303, the amount of intake air is controlled by the throttle valve 19. Next, the routine proceeds to step 304.

At step 304, it is judged if the engine load L is lower than the load $L_1$ shown in FIG. 9. When $L \geq L_1$, the routine proceeds to step 305 where the value of the mechanical compression ratio determination function f(PV) is calculated. In this case, as explained above, this mechanical compression ratio determination function f(PV) is calculated from the pressure in the intake passage detected by the pressure sensor 25 and the closing timing IC of the intake valve 7 or is calculated from the pressure in the intake passage detected by the pressure sensor 25, the amount of intake air detected by the intake air amount detector 16, and the engine speed.

Next, at step 306, the target mechanical compression ratio CRO corresponding to the engine speed is calculated from FIG. 13. Next, at step 307, it is judged if the mechanical compression ratio CR is higher than the target mechanical compression ratio CRO calculated from FIG. 13 plus the fixed value γ, that is, the value CRO+γ. When CR>CRO+γ, the routine proceeds to step 308 where the mechanical compression ratio CR is reduced by the fixed value ΔCR. Next, the routine proceeds to step 312. As opposed to this, when it is judged at step 307 that CR≦CRO+γ, the routine proceeds to step 309 where it is judged if the mechanical compression ratio CR is lower than the target mechanical compression ratio CRO calculated from the FIG. 13 minus the fixed value γ, that is, the value CRO−γ. When CR<CRO−γ, the routine proceeds to step 310 where the mechanical compression ratio CR is increased by a fixed value ΔCR. Next, the routine proceeds to step 312.

On the other hand, when it is judged at step 304 that $L<L_1$, the routine proceeds to step 311 where the mechanical compression ratio CR is made the limit mechanical compression ratio. Next, the routine proceeds to step 312. At step 312, the calculated mechanical compression ratio CR is obtained by controlling the variable compression ratio mechanism A. That is, when $L \geq L_1$, the mechanical compression ratio CR is controlled to the target mechanical compression ratio CRO, while when $L<L_1$, the mechanical compression ratio CR is fixed to the limit mechanical compression ratio.

Next, an embodiment of controlling the mechanical compression ratio so that the temperature of the gas in the combustion chamber 5 at the end of the compression stroke becomes substantially constant regardless of the engine load will be explained with reference to FIG. 15 to FIG. 19.

In this case as well, regardless of the engine load, the state of the gas in the combustion chamber 5 at the end of the compression stroke is made the optimum state of the gas giving stable good combustion without causing knocking. Accordingly, it is possible to obtain good combustion stable in all load regions such as at the time of engine low load operation where the mechanical compression ratio becomes maximum.

Figure 15:
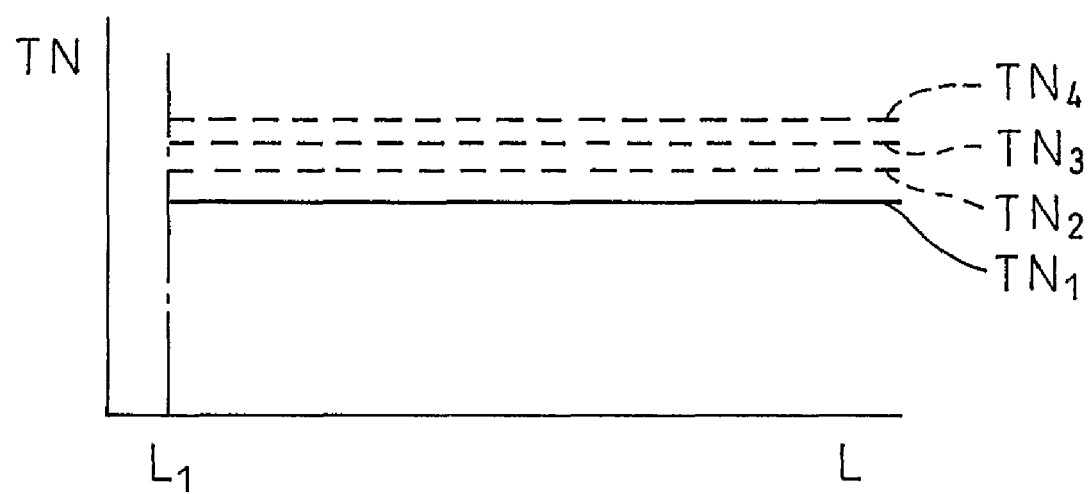
FIG. 15 is a view showing a target temperature.

FIG. 15 shows the relationship between the target gas temperature TN in the combustion chamber 5 at the end of the compression stroke, more precisely speaking, the target gas temperature TN in the combustion chamber 5 right before combustion or right before ignition by the spark plug 6, and the engine load L. In FIG. 15, $TN_1$, $TN_2$, $TN_3$, and $TN_4$ show target gas temperatures for different engine speeds. In this case, for the engine speed, there is the relationship $TN_1 < TN_2 < TN_3 < TN_4$. That is, as explained above, the higher the engine speed, the more difficult the knocking becomes, therefore the target gas temperature TN is made higher the higher the engine speed.

As shown in FIG. 15, the target gas temperature TN is made constant under the same engine speed regardless of the engine load. However, this target gas temperature TN may also be changed somewhat according to the magnitude of the engine load.

Figure 16:
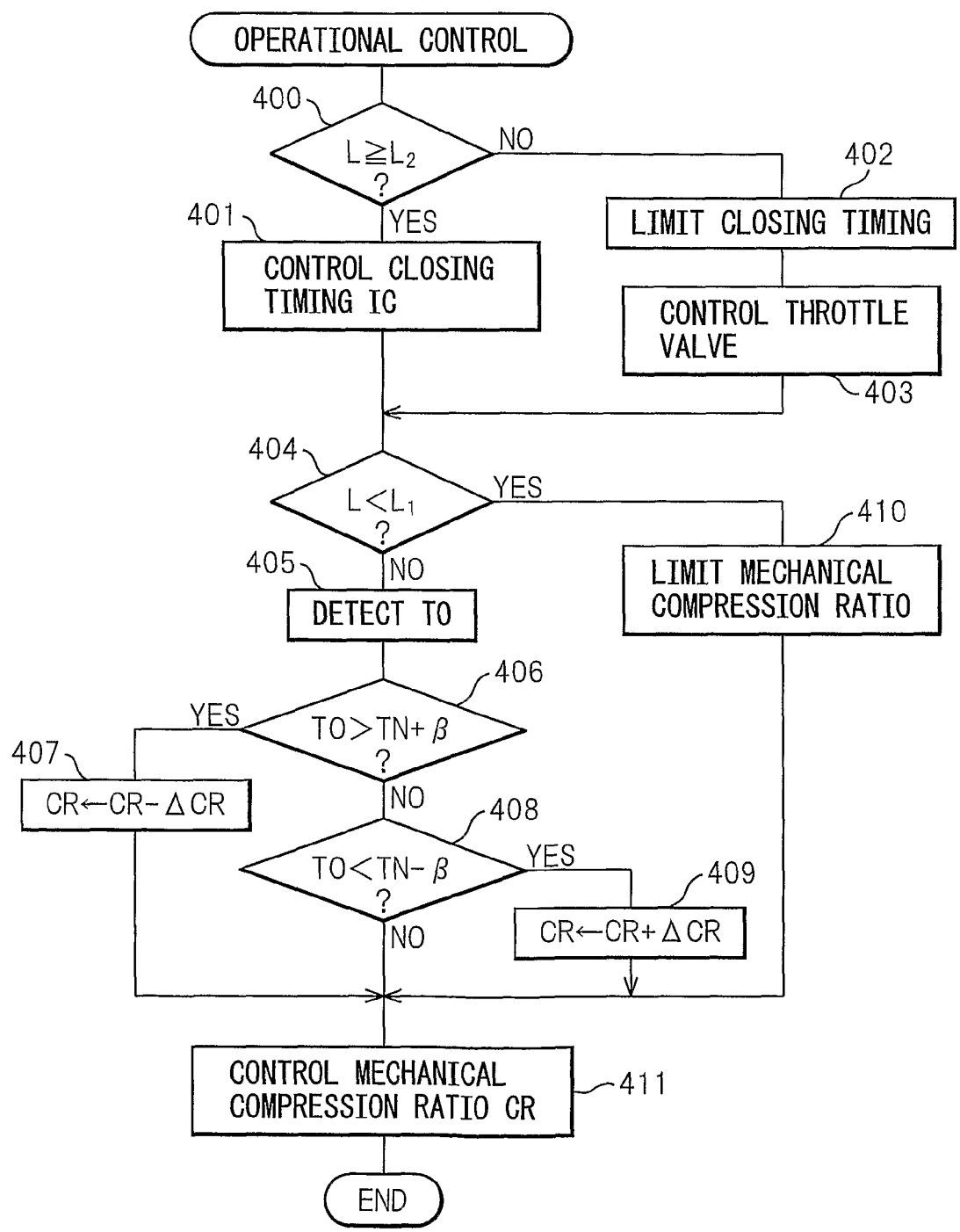
FIG. 16 is a flowchart for operational control.

FIG. 16 shows the operation control routine when directly detecting the temperature of the gas in the combustion chamber 5 and controlling the mechanical compression ratio based on the detected temperature of gas in the combustion chamber 5.

Referring to FIG. 16, first, at step 400, it is judged if the engine load L is higher than the load $L_2$ shown in FIG. 9. When $L \geq L_2$, the routine proceeds to step 401 where the map shown in FIG. 10(A) is used to calculate the closing timing IC of the intake valve 7 and the intake valve 7 is controlled to close at the calculated closing timing IC. Next, the routine proceeds to step 404. As opposed to this, when it is judged at step 400 that $L<L_2$, the routine proceeds to step 402 where the closing timing of the intake valve 7 is made the limit closing timing, then at step 403, the amount of intake air is controlled by the throttle valve 19. Next, the routine proceeds to step 404.

At step 404, it is judged if the engine load L is lower than the load $L_1$ shown in FIG. 9. When $L \geq L_1$, the routine proceeds to step 405 where the temperature T0 of the gas in the combustion chamber 5 at the end of the compression stroke is detected by the temperature sensor 24. Next, at step 406, it is judged if the gas temperature TO is higher than the target gas temperature TN calculated from FIG. 15 plus a fixed value β, that is, the value TN+β. When TO>TN+β, the routine proceeds to step 407 where the mechanical compression ratio CR is reduced by a fixed value ΔCR. Next, the routine proceeds to step 411. As opposed to this, when it is judged at step 406 that TO≦TN+β, the routine proceeds to step 408 where it is judged if the gas temperature TO is lower than the target gas temperature TN calculated at FIG. 15 minus the fixed value β, that is, the value TN−β. When TO<TN−β, the routine proceeds to step 409 where the mechanical compression ratio CR is increased by the fixed value ΔCR. Next, the routine proceeds to step 411.

On the other hand, when it is judged at step 404 that L<$L_1$, the routine proceeds to step 410 where the mechanical compression ratio CR is made the limit mechanical compression ratio. Next, the routine proceeds to step 411. At step 411, the calculated mechanical compression ratio CR is obtained by controlling the variable compression ratio mechanism A. That is, when L≧$L_1$, the gas temperature TO is made the target gas temperature TN by controlling the mechanical compression ratio CR, while when L<$L_1$, the mechanical compression ratio CR is fixed to the limit mechanical compression ratio.

Figure 17:
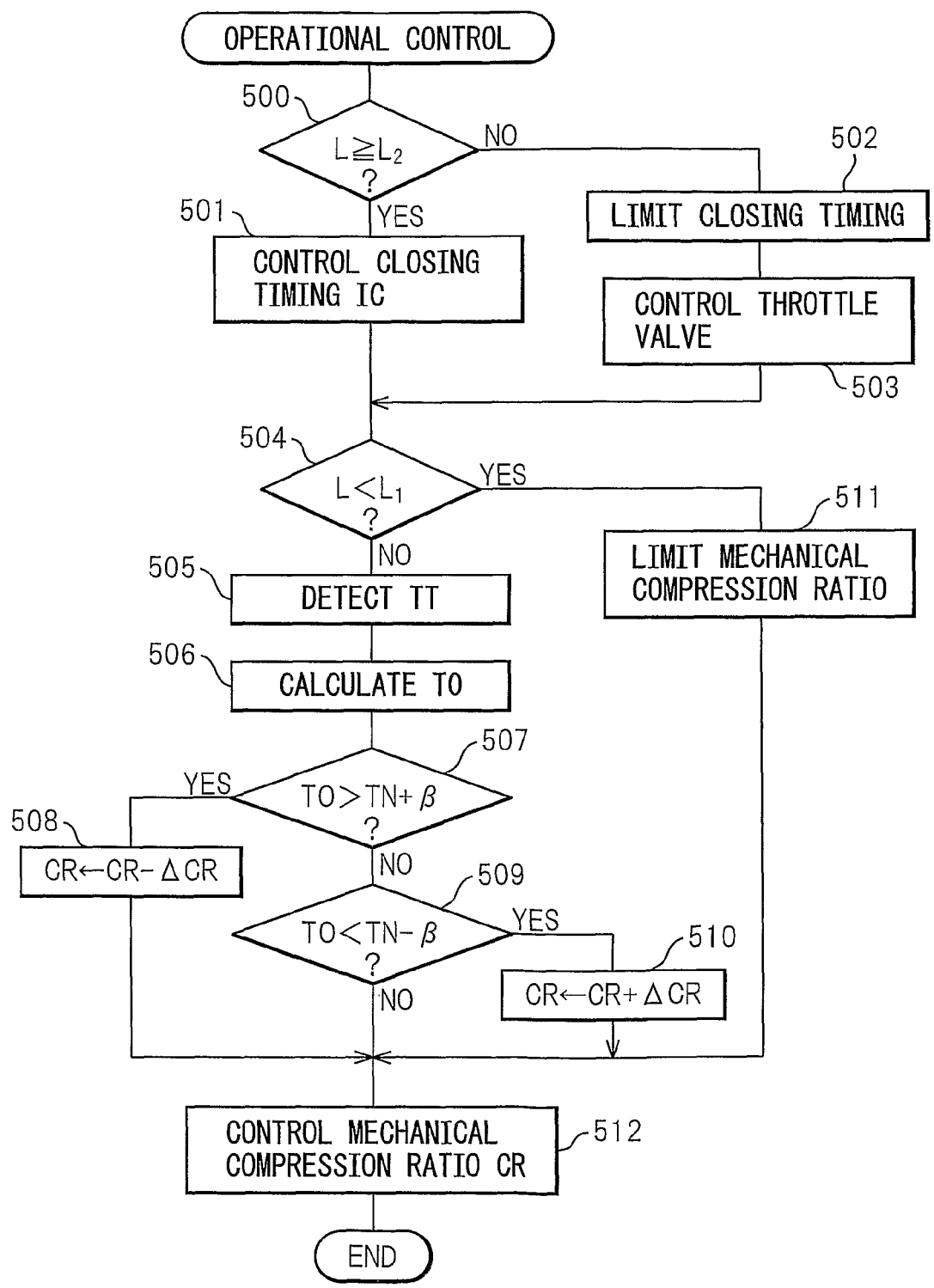
FIG. 17 is a flowchart for operational control.

FIG. 17 shows the operation control routine when detecting the temperature of the intake air in the combustion chamber 5, estimating from this detected temperature the temperature of the gas at the end of the compression stroke combustion chamber 5, and controlling the mechanical compression ratio based on the estimated temperature of the gas in the combustion chamber 5.

Referring to FIG. 17, first, at step 500, it is judged if the engine load L is higher than the load $L_2$ shown in FIG. 9. When L≧$L_2$, the routine proceeds to step 501 where the map shown in FIG. 10(A) is used to calculate the closing timing IC of the intake valve 7 and the intake valve 7 is controlled so as to close at the calculated closing timing IC. Next, the routine proceeds to step 504. As opposed to this, when it is judged at step 500 that L<$L_2$, the routine proceeds to step 502 where the closing timing of the intake valve 7 is made the limit closing timing, then at step 503, the amount of intake air is controlled by the throttle valve 19. Next, the routine proceeds to step 504.

At step 504, it is judged if the engine load L is lower than the load $L_1$ shown in FIG. 9. When L≧$L_1$, the routine proceeds to step 505 where the temperature sensor 26 is used to detect the temperature TT of the intake air sucked into the combustion chamber 5 and the volume $V_1$ of the combustion chamber 5 is calculated from the closing timing IC of the intake valve 7 at the actual time of start of compression, for example, the volume $V_0$ of the combustion chamber 5 right before ignition is calculated from the ignition timing. Next, at step 506, the temperature TO of the gas inside the combustion chamber 5 at the end of the compression stroke is calculated from the detected temperature TT of the suction air and $V_1$, $V_0$. That is, if the temperature is T, the volume is V, and the ratio of specific heat is K ($=C_p/C_v$), when adiabatic compression is performed, the relationship of $TV^{K-1}$=constant stands. If making the temperature of the gas in the combustion chamber 5 at the time of start of adiabatic compression the temperature TT of the suction air, it is possible to use this relationship to find the gas temperature T0 in the combustion chamber 5 at the end of the compression stroke.

Next, at step 507, it is judged if the gas temperature TO is higher than the target gas temperature TN calculated from FIG. 15 plus a fixed value β, that is, the value TN+β. When TO>TN+β, the routine proceeds to step 508 where the mechanical compression ratio CR is reduced by a fixed value ΔCR. Next, the routine proceeds to step 512. As opposed to this, when it is judged at step 507 that TO≦TN+β, the routine proceeds to step 509 where it is judged whether the gas temperature TO is lower than the target gas temperature TN calculated from FIG. 15 minus the fixed value β, that is, the value TN−β. When TO<TN−β, the routine proceeds to step 510 where the mechanical compression ratio CR is increased by a fixed value ΔCR. Next, the routine proceeds to step 512.

On the other hand, when it is judged at step 504 that L<$L_1$, the routine proceeds to step 511 where the mechanical compression ratio CR is made the limit engine compression ratio. Next, the routine proceeds to step 512. At step 512, the calculated mechanical compression ratio CR is obtained by controlling the variable compression ratio mechanism A.

Figure 18:
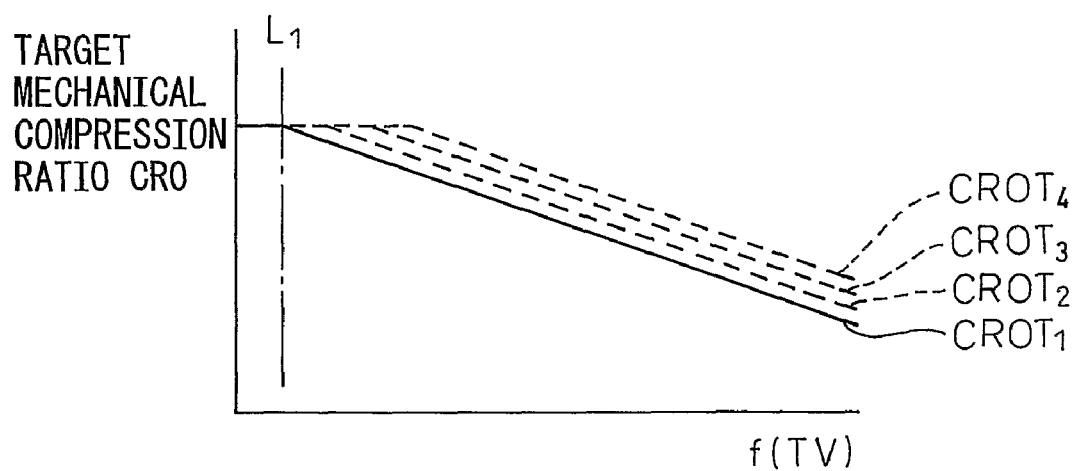
FIG. 18 is a view showing a target mechanical compression ratio.
Figure 19:
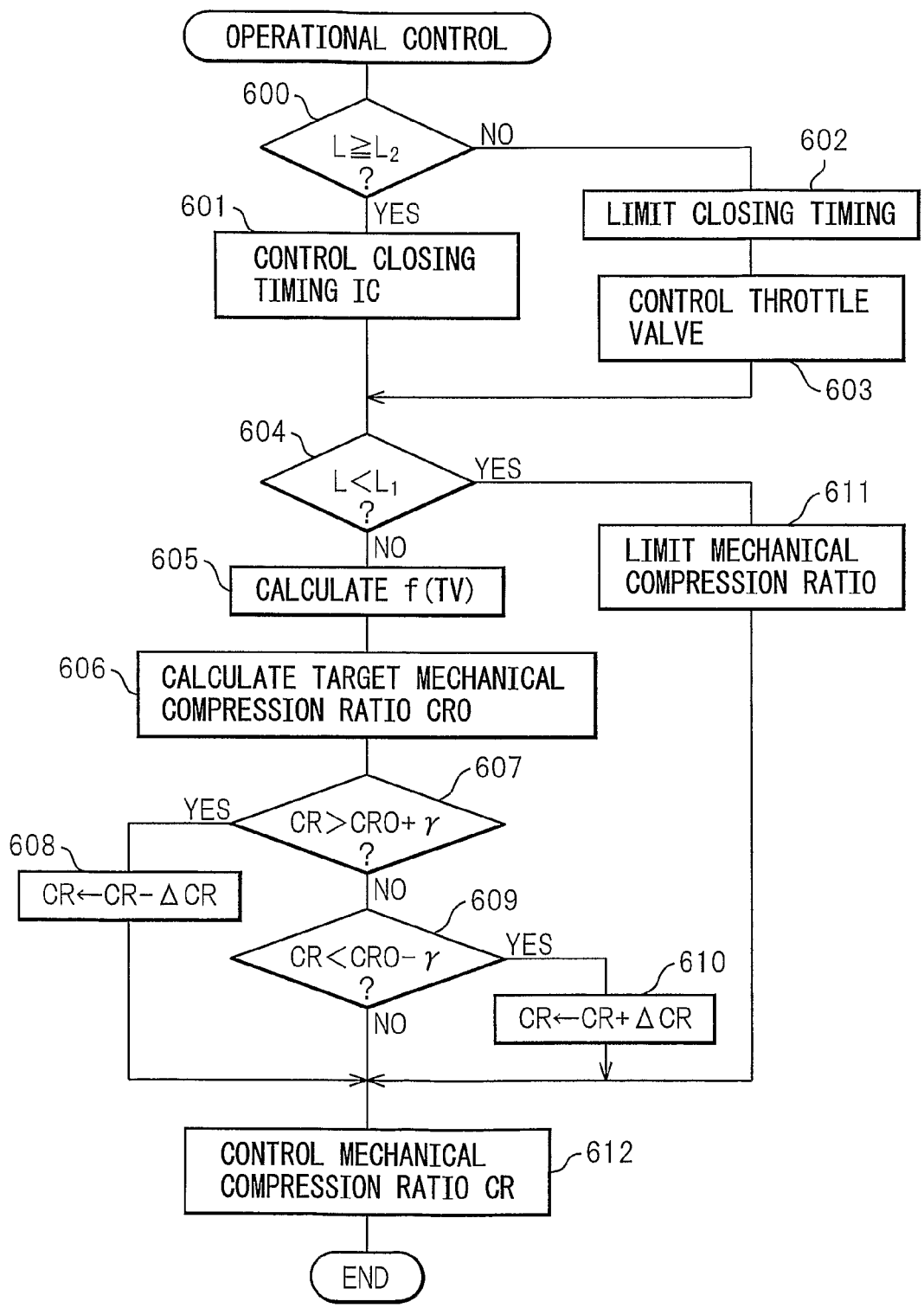
FIG. 19 is a flowchart for operational control.

FIG. 18 and FIG. 19 show a modification. In this modification, as shown in FIG. 18, the relationship between the target mechanical compression ratio CRO and mechanical compression ratio determination function f(TV) required for making the temperature of the gas in the combustion chamber 5 at compression top dead center the target gas temperature is stored in advance. Based on this relationship, the mechanical compression ratio is controlled. Note that in FIG. 18, $CROT_1$, $CROT_2$, $CROT_3$, and $CROT_4$ show target mechanical compression ratios for respectively different engine speeds. In this case, for the engine speed, there is the relationship $CROT_1 < CROT_2 < CROT_3 < CROT_4$. That is, the higher the engine speed, the higher the target mechanical compression ratio is made.

Next, the mechanical compression ratio determination function f(TV) will be explained. If the temperature in the combustion chamber 5 and the volume of the combustion chamber 5 at compression top dead center are respectively $T_0$ and $V_0$, the volume of the combustion chamber 5 at compression bottom dead center is $V_s$, the temperature in the combustion chamber 5 and the volume of the combustion chamber 5 at the time of actual start of the compression action are respectively $T_1$ and $V_1$, at the time of adiabatic compression, $T_0 V_0^{K-1} = T_1 V_1^{K-1}$ stands. If modifying this equation, $V_0 = (T_1/T_0)^{1/(K-1)} \cdot V_1$. On the other hand, the mechanical compression ratio is expressed by $V_s/V_0$. Therefore, the mechanical compression ratio becomes expressed by $V_s/V_0 = V_s \cdot T_0^{1/(K-1)} / (T_1^{1/(K-1)} \cdot V_1)$. Here, $T_1^{1/(K-1)} \cdot V_1$ is made the mechanical compression ratio determination function f(TV). In this case, the relationship between the mechanical compression ratio determination function f(TV) and target mechanical compression ratio CRO becomes as shown in FIG. 18.

That is, as shown in FIG. 18, if the gas temperature $T_1$ in the combustion chamber 5 at the actual time of start of compression becomes high, the mechanical compression ratio determination function f(TV) becomes larger and therefore the target mechanical compression ratio CRO falls. On the other hand, if the volume $V_1$ of the combustion chamber 5 at the actual time of start of compression becomes small, the mechanical compression ratio determination function f(TV) becomes small, therefore the target mechanical compression ratio CRO becomes large. In the embodiment according to the present invention, the gas temperature in the suction passage detected by the temperature sensor 26 is made the gas temperature $T_1$ in the combustion chamber 5 at the actual time of start of compression.

On the other hand, the volume $V_1$ of the combustion chamber 5 at the actual time of start of compression can be calculated from the closing timing IC of the intake valve 7. Further, this volume $V_1$, as explained above, can be calculated from the amount of intake air Ga detected by the intake air amount detector 16 and the engine speed N.

Referring to FIG. 19, first, at step 600, it is judged if the engine load L is higher than the load $L_2$ shown in FIG. 9. When L≧$L_2$, the routine proceeds to step 601 where the map shown in FIG. 10(A) is used to calculate the closing timing IC of the intake valve 7 and the intake valve 7 is controlled to close at the calculated closing timing IC. Next, the routine proceeds to step 604. As opposed to this, when at step 600 it is judged that L<$L_2$, the routine proceeds to step 602 where the closing timing of the intake valve 7 is made the limit closing timing, next, at step 603, the amount of intake air is controlled by the throttle valve 19. Next, the routine proceeds to step 604.

At step 604, it is judged whether the engine load L is lower than the load $L_1$ shown in FIG. 9. When $L \geq L_1$, the routine proceeds to step 605 where the value of the mechanical compression ratio determination function f(TV) is calculated. In this case, as explained above, this mechanical compression ratio determination function f(TV) is calculated from the gas temperature in the intake passage detected by the temperature sensor 26 and the closing timing IC of the intake valve 7 or is calculated from the gas temperature in the intake passage detected by the temperature sensor 26, the amount of intake air detected by the intake air amount detector 16, and the engine speed.

Next, at step 606, the target mechanical compression ratio CRO corresponding to the engine speed is calculated from FIG. 18. Next, at step 607, it is judged whether the mechanical compression ratio CR is higher than the target mechanical compression ratio CRO calculated from FIG. 18 plus a fixed value γ, that is, the value CRO+γ. When CR>CRO+γ, the routine proceeds to step 608 where the mechanical compression ratio CR is reduced by a fixed value ΔCR. Next, the routine proceeds to step 612. As opposed to this, when it is judged at step 607 that CR≦CRO+γ, the routine proceeds to step 609 where it is judged whether the mechanical compression ratio CR is lower than the target mechanical compression ratio CRO calculated at FIG. 18 minus the fixed value γ, that is, the value CRO−γ. When CR<CRO−γ, the routine proceeds to step 609 where the mechanical compression ratio CR is increased by a fixed value ΔCR. Next, the routine proceeds to step 612.

On the other hand, when it is judged at step 604 that L<$L_1$, the routine proceeds to step 611 where the mechanical compression ratio CR is made the limit engine compression ratio. Next, the routine proceeds to step 612. At step 612, the calculated mechanical compression ratio CR is obtained by controlling the variable compression ratio mechanism A. That is, when $L \geq L_1$, the mechanical compression ratio CR is controlled to the target mechanical compression ratio CRO, while when $L \geq L_1$, the mechanical compression ratio CR is fixed at the limit engine compression ratio.

Figure 21:
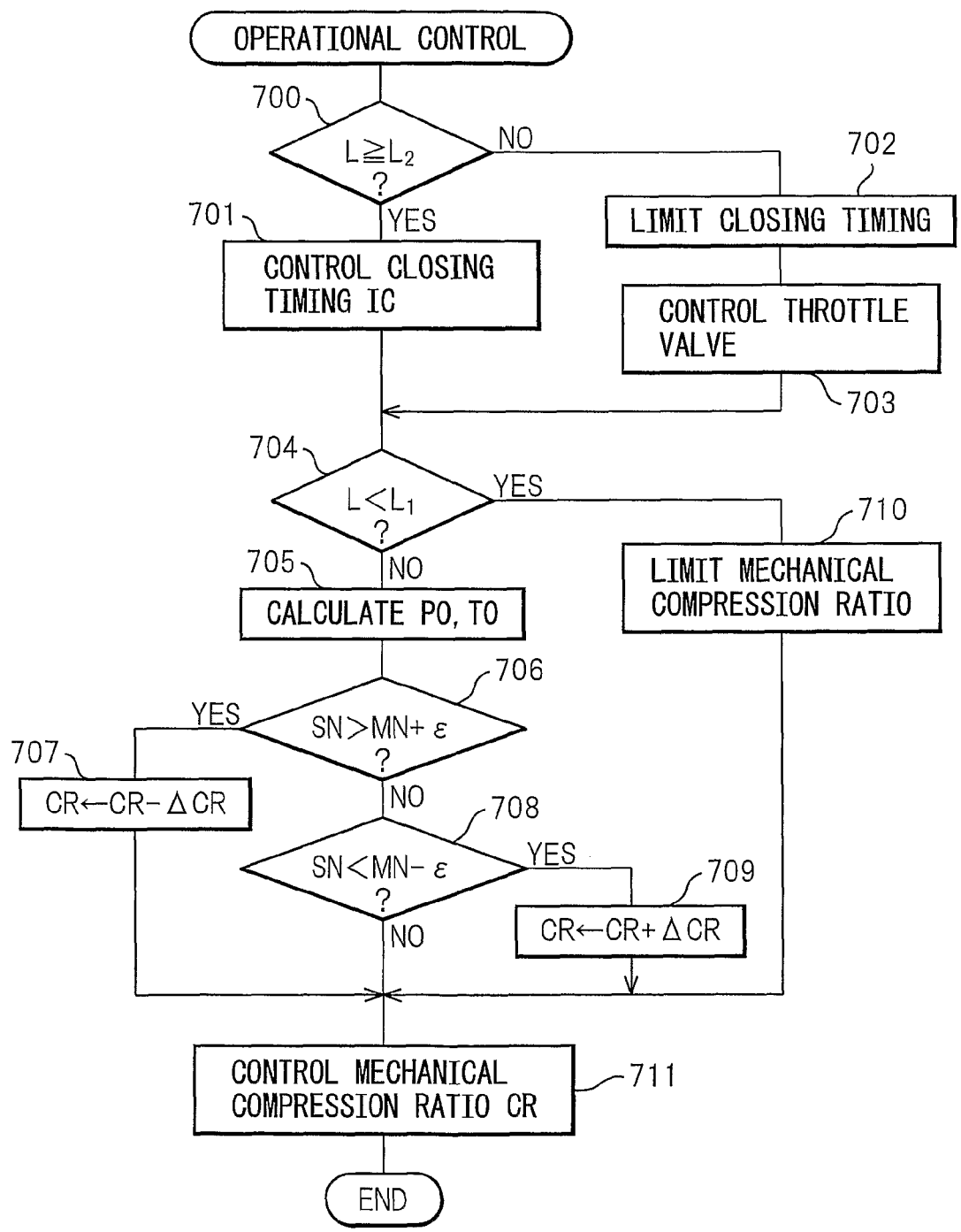
FIG. 21 is a flowchart for operational control.

FIG. 20 and FIG. 21 show still another embodiment.

FIG. 20(A) shows the relationship between the pressure P0 in the combustion chamber 5 and gas temperature TO at the end of the compression stroke right before for ignition and the knocking limit. Even if the pressure PO is somewhat low, the higher the gas temperature TO, the more knocking occurs, while even if the gas temperature TO is somewhat low, the higher the pressure P, the more knocking occurs, so the knocking limit is expressed as shown in FIG. 20(A).

In this embodiment, the pressure PO and gas temperature TO are made to become the target pressure and target gas temperature on the target value MN positioned at the side slightly lower than the knocking limit at FIG. 20(A) by controlling the mechanical compression ratio. This target value MN is set for different engine speeds as shown in FIG. 20(B). In this case, for the engine speed, there is the relationship $MN_1 < MN_2 < MN_3 < MN_4$. That is, as explained above, the higher the engine speed, the more knocking becomes difficult, therefore the target value MN is made higher the higher the engine speed.

Next, the operation control routine will be explained with reference to FIG. 21.

Referring to FIG. 21, first, at step 700, it is judged if the engine load L is higher than the load $L_2$ shown in FIG. 9. When $L \geq L_2$, the routine proceeds to step 701 where the map shown in FIG. 10(A) is used to calculate the closing timing IC of the intake valve 7 and the intake valve 7 is controlled so as to close at the calculated closing timing IC. Next, the routine proceeds to step 704. As opposed to this, when it is judged at step 700 that L<$L_2$, the routine proceeds to step 702 where the closing timing of the intake valve 7 is made the limit closing timing, then at step 703 the amount of intake air is controlled by the throttle valve 19. Next, the routine proceeds to step 704.

At step 704, it is judged whether the engine load L is lower than the load $L_1$ shown in FIG. 9. When $L \geq L_1$, the routine proceeds to step 705 where the pressure P0 in the combustion chamber 5 and gas temperature TO at the end of the compression stroke are calculated. In this case, this pressure PO may be found by using the pressure sensor 23 to directly detect the pressure in the combustion chamber 5. Alternatively, the pressure sensor 25 may be used to detect the pressure in the intake passage and the pressure P0 found from this detected pressure using the above relationship $PV^K$=constant. Similarly, the temperature TO of the gas in the combustion chamber 5 at the end of the compression stroke may be found by directly detecting it by a temperature sensor 24. Alternatively, a temperature sensor 26 may be used to detect the temperature of the intake air flowing into the combustion chamber 5 and the gas temperature TO found from this detected temperature using the above-mentioned $TV^{K-1}$=constant.

When the pressure P0 in the combustion chamber 5 and the gas temperature TO at the end of the compression stroke are calculated, the routine proceeds to step 706 where it is judged if the point SN determined from the pressure PO and gas temperature TO is at the higher side from the target value MN calculated from FIG. 20(B) plus a fixed value ε, that is, the value MN+ε. When SN>MN+ε, the routine proceeds to step 707 where the mechanical compression ratio CR is reduced by the fixed value ΔCR. Next, the routine proceeds to step 711. As opposed to this, when it is judged at step 706 that SN≦MN+ε, the routine proceeds to step 708 where it is judged if the point SN determined from the pressure PO and gas temperature TO is at the lower side from the target value MN calculated from FIG. 20(B) minus the fixed value ε, that is, the value MN−ε. When SN<MN−ε, the routine proceeds to step 709 where the mechanical compression ratio CR is increased by a fixed value ΔCR. Next, the routine proceeds to step 711.

On the other hand, when it is judged at step 704 that L<$L_1$, the routine proceeds to step 710 where the mechanical compression ratio CR is made the limit mechanical compression ratio. Next, the routine proceeds to step 711. At step 711, the calculated mechanical compression ratio CR is obtained by controlling variable compression ratio mechanism A. That is, when $L \geq L_1$, the pressure PO and gas temperature TO are made the target value MN by controlling the mechanical compression ratio CR. When L<$L_1$, the mechanical compression ratio CR is fixed to the limit mechanical compression ratio.

Next, an embodiment where the density of the gas in the combustion chamber 5 at the end of the compression stroke is made to become substantially constant regardless of the engine load by controlling the mechanical compression ratio will be explained with reference to FIG. 22 and FIG. 23.

In this case as well, regardless of the engine load, the state of the gas in the combustion chamber 5 at the end of the compression stroke is made the optimum state of the gas giving stable good combustion without causing knocking. Accordingly, it is possible to obtain good combustion stable in all load regions such as at the time of engine low load operation where the mechanical compression ratio becomes maximum.

Figure 22:
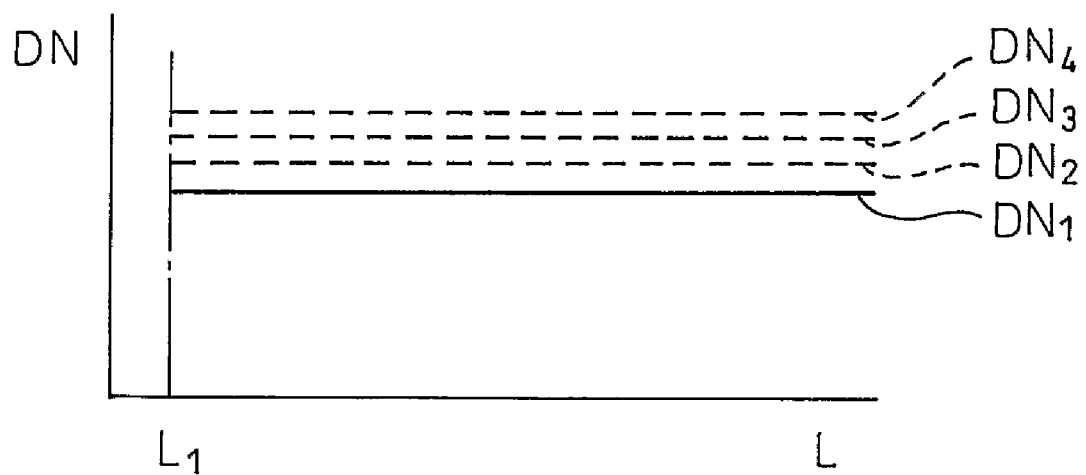
FIG. 22 is a view showing a target density.

FIG. 22 shows the relationship between the target gas density DN in the combustion chamber 5 at the end of the compression stroke, more precisely speaking, the target gas density DN in the combustion chamber 5 right before combustion or right before ignition by the spark plug 6, and the engine load L. In FIG. 22, $DN_1$, $DN_2$, $DN_3$, and $DN_4$ show target gas densities for different engine speeds. In this case, for the engine speed, there is the relationship $DN_1<DN_2<DN_3<DN_4$. That is, as explained above, the higher the engine speed, the more difficult the knocking becomes, therefore the target gas density DN is made higher the higher the engine speed.

As shown in FIG. 22, the target gas density DN is made constant under the same engine speed regardless of the engine load. However, this target gas density DN may also be changed somewhat according to the magnitude of the engine load.

Figure 23:
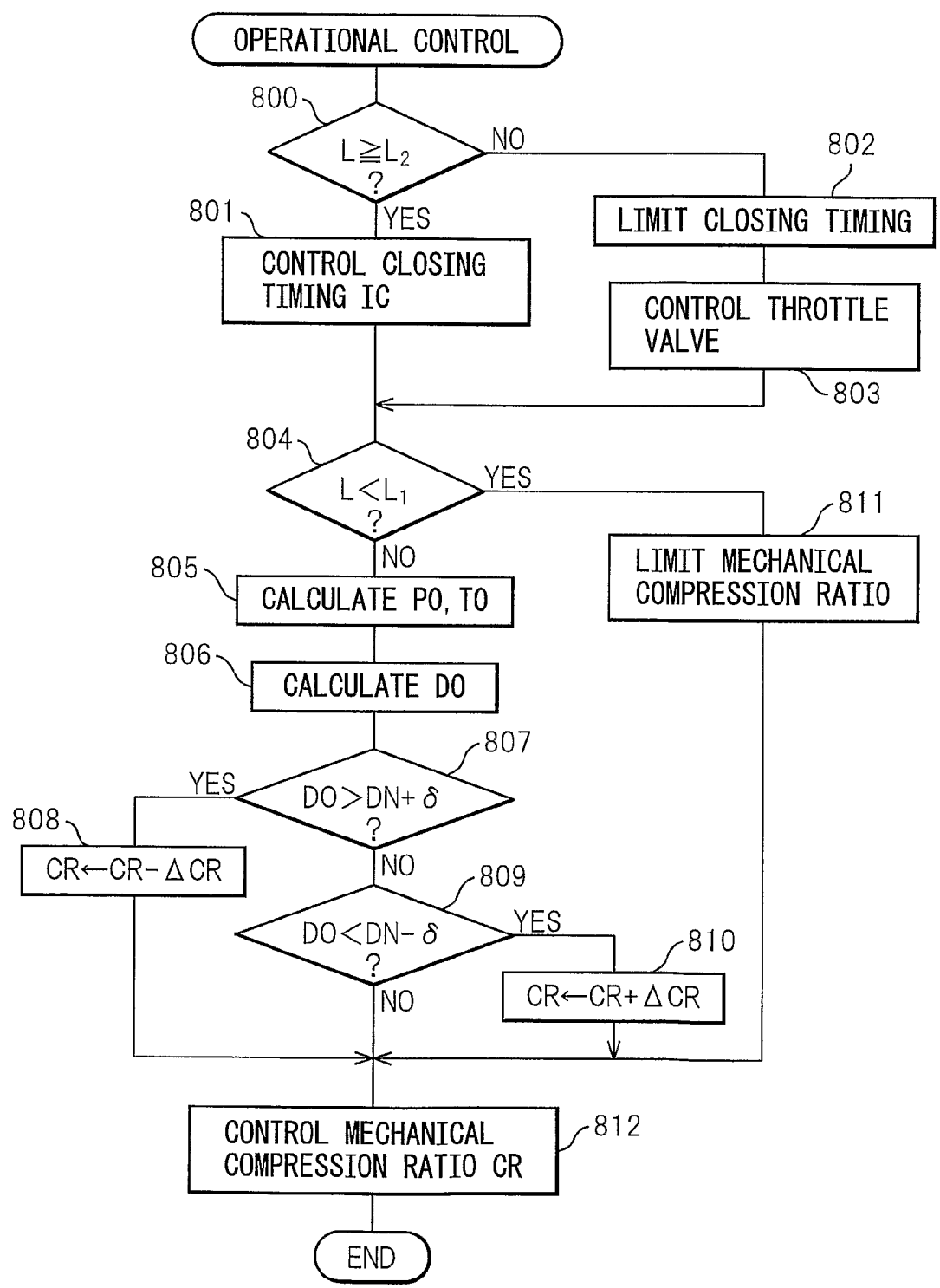
FIG. 23 is a flowchart for operational control.

FIG. 23 shows the operation control routine when finding the pressure in the combustion chamber 5 and gas temperature at the end of the compression stroke, calculating the density of the gas in the combustion chamber 5 at the end of the compression stroke from these pressure and gas temperature, and controlling the mechanical compression ratio based on the calculated density of gas in the combustion chamber 5.

Referring to FIG. 23, first, at step 800, it is judged if the engine load L is higher than the load $L_2$ shown in FIG. 9. When $L \geq L_2$, the routine proceeds to step 801 where the map shown in FIG. 10(A) is used to calculate the closing timing IC of the intake valve 7 and the intake valve 7 is controlled to close at the calculated closing timing IC. Next, the routine proceeds to step 804. As opposed to this, when it is judged at step 800 that $L<L_2$, the routine proceeds to step 802 where the closing timing of the intake valve 7 is made the limit closing timing, then at step 803, the amount of intake air is controlled by the throttle valve 19. Next, the routine proceeds to step 804.

At step 804, it is judged if the engine load L is lower than the load $L_1$ shown in FIG. 9. When $L \geq L_1$, the routine proceeds to step 805 where the pressure P0 in the combustion chamber 5 and gas temperature T0 at the end of the compression stroke are calculated. In this case, this pressure PO can be found by using the pressure sensor 23 to directly detect the pressure in the combustion chamber 5. Alternatively, the pressure sensor 25 may be used to detect the pressure in the intake passage and the pressure P0 found from this detected pressure using the relationship $PV^K$=constant. Similarly, the temperature T0 of the gas in the combustion chamber 5 at the end of the compression stroke can be found by using the temperature sensor 24 to directly detect the temperature of the gas in the combustion chamber 5. Alternatively, the temperature sensor 26 may be used to detect the temperature of the intake air flowing into the combustion chamber 5 and the gas temperature T0 found from this detected temperature using the relationship $TV^{K-1}$=constant.

When the pressure P0 in the combustion chamber 5 and gas temperature T0 at the end of the compression stroke are calculated, the routine proceeds to step 806 where the state equation of the gas (PV=(W/M)·RT, where W indicates the mass of the suction gas and M the molecular weight of the suction gas) is used to calculate the density DO of the gas in the combustion chamber 5 at the end of the compression stroke (=W/V=(M/R)·(PO/TO)).

Next, at step 807, it is judged if the gas density DO is higher than the target gas density DN calculated from FIG. 22 plus a fixed value δ, that is, the value DN+δ. When DO>DN+δ, the routine proceeds to step 808 where the mechanical compression ratio CR is reduced by a fixed value ΔCR. Next, the routine proceeds to step 812. As opposed to this, when it is judged at step 807 that DO≦DN+δ, the routine proceeds to step 809 where it is judged if the gas density DO is lower than the target gas density DN calculated from FIG. 22 minus the fixed value δ, that is, the value DN−δ. When DO<DN−δ, the routine proceeds to step 810 where the mechanical compression ratio CR is increased by the fixed value ΔCR. Next, the routine proceeds to step 812.

On the other hand, when it is judged at step 804 that $L<L_1$, the routine proceeds to step 811 where the mechanical compression ratio CR is made the limit mechanical compression ratio. Next, the routine proceeds to step 812. At step 812, the calculated mechanical compression ratio CR is obtained by controlling the variable compression ratio mechanism A. That is, when $L \geq L_1$, the gas density DO is made the target gas density DN by controlling the mechanical compression ratio CR, while when $L<L_1$, the mechanical compression ratio CR is fixed to the limit mechanical compression ratio.

The invention claimed is:

1. A method of controlling a mechanical compression ratio by a variable compression mechanism and controlling a closing timing of an intake valve by a variable valve timing mechanism in a spark ignition type internal combustion engine, the mechanical compression ratio changes by changing a combustion chamber volume, the closing timing of an intake valve being controlled so that an amount of intake air in accordance with the required load is fed into a combustion chamber, wherein the mechanical compression ratio is controlled so that the pressure in the combustion chamber at the end of the compression stroke becomes substantially constant under substantially the same engine speed regardless of the engine load.

2. A method as set forth in claim 1, wherein the pressure in the combustion chamber at the end of the compression stroke is the pressure in the combustion chamber right before combustion or right before ignition by a spark plug.

3. A method as set forth in claim 1, wherein said pressure in the combustion chamber made constant is made higher the higher the engine speed.

4. A method as set forth in claim 1, wherein the pressure in the combustion chamber is directly detected and the mechanical compression ratio is controlled based on the detected pressure in the combustion chamber.

5. A method as set forth in claim 1, wherein the pressure in the engine intake passage is detected, the pressure in the combustion chamber at the end of the compression stroke is estimated from the detected pressure, and the mechanical compression ratio is controlled based on the estimated pressure in the combustion chamber.

6. A method as set forth in claim 1, wherein the mechanical compression ratio required for making the pressure in the combustion chamber at the end of the compression stroke substantially constant regardless of the engine load is stored as a function of the pressure in the engine intake passage and a representative value representing the amount of intake air fed into the combustion chamber, the pressure in the intake passage and said representative value are detected, and the mechanical compression ratio is determined based on the detected pressure and representative value.

7. A method as set forth in claim 1, wherein at the time of engine low load operation, the mechanical compression ratio is made maximum to obtain an expansion ratio of 20 or more.

8. A method as set forth in claim 1, wherein the closing timing of the intake valve is shifted as the engine load becomes lower in a direction away from intake bottom dead center until a limit closing timing enabling control of the amount of intake air fed into the combustion chamber.

9. A method as set forth in claim 8, wherein in a region of a load higher than the engine load when the closing timing of the intake valve reaches said limit closing timing, the amount of intake air fed into the combustion chamber is controlled by the closing timing of the intake valve without depending on a throttle valve arranged in an engine intake passage.

10. A method as set forth in claim 9, wherein in a region of a load higher than the engine load when the closing timing of the intake valve reaches said limit closing timing, the throttle valve is held in a fully opened state.

11. A method as set forth in claim 8, wherein in a region of a load lower than the engine load when the closing timing of the intake valve reaches said limit closing timing, the amount of intake air fed into the combustion chamber is controlled by a throttle valve arranged in an engine intake passage.

12. A method as set forth in claim 8, wherein in a region of a load lower than the engine load when the closing timing of the intake valve reaches said limit closing timing, the closing timing of the intake valve is held at said limit closing timing.

13. A method as set forth in claim 1, wherein when the mechanical compression ratio is increased to the limit mechanical compression ratio, the mechanical compression ratio is held at said limit mechanical compression ratio.

14. A method of controlling a mechanical compression ratio by a variable compression mechanism and controlling a closing timing of an intake valve by a variable valve timing mechanism in a spark ignition type internal combustion engine, the mechanical compression ratio changes by changing a combustion chamber volume, the closing timing of the intake valve being controlled so that an amount of intake air in accordance with the required load is fed into a combustion chamber, wherein the mechanical compression ratio is controlled so that the temperature of the gas in the combustion chamber at the end of the compression stroke becomes substantially constant under substantially the same engine speed regardless of the engine load.

15. A method as set forth in claim 14, wherein the temperature of the gas in the combustion chamber at the end of the compression stroke is the temperature in the combustion chamber right before combustion or right before ignition by a spark plug.

16. A method as set forth in claim 14, wherein the temperature of the gas in the combustion chamber made constant is made higher the higher the engine speed.

17. A method as set forth in claim 14, wherein the temperature of the gas in the combustion chamber is directly detected and the mechanical compression ratio is controlled based on the detected temperature of the gas in the combustion chamber.

18. A method as set forth in claim 14, wherein the temperature of the intake air flowing into the combustion chamber is detected, the temperature of the gas in the combustion chamber at the end of the compression stroke is estimated from the detected temperature, and the mechanical compression ratio is controlled based on the estimated temperature of the gas in the combustion chamber.

19. A method as set forth in claim 14, wherein the mechanical compression ratio required for making the temperature of the gas in the combustion chamber at the end of the compression stroke substantially constant regardless of the engine load is stored as a function of the temperature of the intake air flowing into the combustion chamber and a representative value representing the amount of intake air fed into the combustion chamber, the temperature of the intake air and said representative value are detected, and the mechanical compression ratio is determined based on these temperature and representative value.

20. A method of controlling a mechanical compression ratio by a variable compression mechanism and controlling a closing timing of an intake valve by a variable valve timing mechanism in a spark ignition type internal combustion engine, the mechanical compression ratio changes by changing a combustion chamber volume, the closing timing of the intake valve being controlled so that an amount of intake air in accordance with the required load is fed into a combustion chamber, wherein target values of the pressure in the combustion chamber and gas temperature at the end of the compression stroke are stored in advance, and the mechanical compression ratio is controlled so that the pressure in the combustion chamber and gas temperature at the end of the compression stroke become the stored target values.

21. A method as set forth in claim 20, wherein the pressure in the combustion chamber and gas temperature at the end of the compression stroke is the pressure in the combustion chamber and gas temperature right before combustion or right before ignition by a spark plug.

22. A method as set forth in claim 20, wherein said target value is made higher the higher the engine speed.

23. A method as set forth in claim 20, wherein the pressure in the combustion chamber at the end of the compression stroke is found by directly detecting the pressure in the combustion chamber or by estimation from the detected pressure in the intake passage.

24. A method as set forth in claim 20, wherein the temperature of the gas in the combustion chamber at the end of the compression stroke is found by directly detecting the temperature of the gas in the combustion chamber or by estimation from the detected temperature of intake air flowing into the combustion chamber.

25. A method of controlling a mechanical compression ratio by a variable compression mechanism and controlling a closing timing of an intake valve by a variable valve timing mechanism in a spark ignition type internal combustion engine, the mechanical compression ratio changes by changing a combustion chamber volume, the closing timing of the intake valve being controlled so that an amount of intake air in accordance with the required load is fed into a combustion chamber, wherein the mechanical compression ratio is controlled so that the density of gas in the combustion chamber at the end of the compression stroke becomes substantially constant under substantially the same engine speed regardless of the engine load.

26. A method as set forth in claim 25, wherein the density of gas in the combustion chamber at the end of the compression stroke is the density of gas in the combustion chamber right before combustion or right before ignition by a spark plug.

27. A method as set forth in claim 25, wherein the density of gas in the combustion chamber made constant is made higher the higher the engine speed.

28. A method as set forth in claim 25, wherein the pressure in the combustion chamber and gas temperature at the end of the compression stroke are found, the density of gas in the combustion chamber at the end of the compression stroke is calculated from the pressure and gas temperature, and the mechanical compression ratio is controlled based on the calculated density of gas in the combustion chamber.

29. A method as set forth in claim 28, wherein the pressure in the combustion chamber at the end of the compression stroke is found by directly detecting the pressure in the combustion chamber or by estimation from the detected pressure in the intake passage.

30. A method as set forth in claim 28, wherein the temperature of the gas in the combustion chamber at the end of the compression stroke is found by directly detecting the temperature of the gas in the combustion chamber or by estimation from the detected temperature of the intake air flowing into the combustion chamber.

* * * * *